United States Patent
Vardarajan et al.

(10) Patent No.: US 10,756,818 B2
(45) Date of Patent: Aug. 25, 2020

(54) OPTIMIZING PLACEMENT OF A WIRELESS RANGE EXTENDER

(71) Applicant: Belkin International, Inc., Playa Vista, CA (US)

(72) Inventors: Kannan Vardarajan, Irvine, CA (US); Eu Chong Son, Aliso Viejo, CA (US); Dan Nguyen, Huntington Beach, CA (US); Aaron Schneider, Playa Vista, CA (US); Daniel Frysinger, Topanga, CA (US); Genevieve S. Bolton, Seattle, WA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 16/359,893

(22) Filed: Mar. 20, 2019

(65) Prior Publication Data
US 2019/0215074 A1 Jul. 11, 2019

Related U.S. Application Data

(63) Continuation of application No. 15/669,696, filed on Aug. 4, 2017, now Pat. No. 10,284,299, which is a (Continued)

(51) Int. Cl.
*H04B 10/293* (2013.01)
*H04W 16/20* (2009.01)
(Continued)

(52) U.S. Cl.
CPC ..... *H04B 10/2939* (2013.01); *H04B 7/15507* (2013.01); *H04W 16/20* (2013.01);
(Continued)

(58) Field of Classification Search
CPC ............ H04W 24/08; H04W 74/0833; H04W 72/042; H04W 24/10; H04W 72/048;
(Continued)

(56) References Cited

U.S. PATENT DOCUMENTS

| 5,668,562 A | 9/1997 | Cutrer et al. |
| 6,138,162 A | 10/2000 | Pistriotto et al. |

(Continued)

FOREIGN PATENT DOCUMENTS

| CN | 106301834 A | 1/2017 |
| WO | 2017106046 A2 | 6/2017 |

OTHER PUBLICATIONS

TP-Link User Guide "RE210 AC750 Wi-Fi Range Extender", retrieved from https://uk.tp-link.com/res/down/doc/RE210(EU_V1UG.pdf (Aug. 21, 2017) 41 pages.
(Continued)

*Primary Examiner* — Michael J Moore, Jr.
(74) *Attorney, Agent, or Firm* — Kilpatrick Townsend & Stockton LLP

(57) ABSTRACT

Described are systems, devices, and techniques for extending wireless networks and associated systems, devices, and techniques for determination of optimal locations of a wireless range extender, such as by evalauating a quality of a wireless signal originating from a wireless gateway or access device and determining whether an alternative placement of a wireless range extender would result in improved quality. Also described are systems, devices, and techniques for automatically grouping multiple bands of a single wireless access device as well as systems, devices, and techniques that simplify connection of wireless devices to a wireless access device, such as by evaluating wireless mes-
(Continued)

sages transmitted on different bands to determine that the wireless messages originate from the same wireless access device.

20 Claims, 20 Drawing Sheets

Related U.S. Application Data continuation-in-part of application No. 14/972,480, filed on Dec. 17, 2015, now Pat. No. 10,313,892, and a continuation-in-part of application No. 14/514,628, filed on Oct. 15, 2014, now Pat. No. 9,794,782, and a continuation-in-part of application No. 14/493,199, filed on Sep. 22, 2014, now Pat. No. 9,936,039, said application No. 14/493,205 is a continuation of application No. 14/493,075, filed on Sep. 22, 2014, now Pat. No. 9,191,374, said application No. 15/669,696 is a continuation-in-part of application No. 14/493,193, filed on Sep. 22, 2014, now Pat. No. 10,313,467, which is a continuation of application No. 14/493,075, filed on Sep. 22, 2014, now Pat. No. 9,191,374, said application No. 14/493,199 is a continuation of application No. 14/493,075, filed on Sep. 22, 2014, now Pat. No. 9,191,374, said application No. 15/669,696 is a continuation-in-part of application No. 14/493,205, filed on Sep. 22, 2014, now Pat. No. 10,063,650, and a continuation-in-part of application No. 14/339,191, filed on Jul. 23, 2014, now Pat. No. 9,924,513, and a continuation-in-part of application No. 14/294,109, filed on Jun. 2, 2014, now Pat. No. 9,763,247.

(51) Int. Cl.
  *H04W 16/26* (2009.01)
  *H04B 7/155* (2006.01)
  *H04W 84/12* (2009.01)
  *H04W 48/08* (2009.01)

(52) U.S. Cl.
  CPC .......... *H04W 16/26* (2013.01); *H04W 48/08* (2013.01); *H04W 84/12* (2013.01)

(58) Field of Classification Search
  CPC . H04W 76/27; H04W 72/0413; H04W 80/02; H04W 84/12; H04L 5/0048; H04B 17/318; H04B 7/0626; H04B 7/1555
  See application file for complete search history.

(56) References Cited

U.S. PATENT DOCUMENTS

| | | |
|---|---|---|
| 6,505,254 B1 | 1/2003 | Johnson et al. |
| 7,209,703 B1 | 4/2007 | Yarkosky |
| 7,904,951 B1 | 3/2011 | Ebrahimi et al. |
| 7,948,951 B2 | 5/2011 | Wentink |
| 8,121,535 B2 | 2/2012 | Proctor, Jr. et al. |
| 8,131,209 B1 | 3/2012 | Chen et al. |
| 8,160,501 B1 | 4/2012 | Hyde et al. |
| 8,194,585 B2 | 6/2012 | Hahn |
| 8,375,430 B2 | 2/2013 | Grewal et al. |
| 8,904,093 B1 | 12/2014 | Nishimoto et al. |
| 9,301,141 B1 | 3/2016 | Mincher et al. |
| 9,408,016 B2 | 8/2016 | Terry |
| 9,509,764 B1 | 11/2016 | Kolam |
| 9,654,357 B2 | 5/2017 | Fox et al. |
| 10,284,299 B2 | 5/2019 | Vardarajan et al. |
| 2001/0023476 A1 | 9/2001 | Rosenzweig |
| 2002/0016911 A1 | 2/2002 | Chawla et al. |
| 2002/0032772 A1 | 3/2002 | Olstad et al. |
| 2002/0048269 A1 | 4/2002 | Hong et al. |
| 2003/0065743 A1 | 4/2003 | Jenny et al. |
| 2003/0225885 A1 | 12/2003 | Rochberger et al. |
| 2004/0015725 A1 | 1/2004 | Boneh et al. |
| 2004/0064590 A1 | 4/2004 | Starr et al. |
| 2004/0160907 A1 | 8/2004 | Perlman |
| 2006/0015570 A1 | 1/2006 | Khemani et al. |
| 2006/0046646 A1* | 3/2006 | Couper ............... H04B 7/155 455/11.1 |
| 2006/0052099 A1 | 3/2006 | Parker |
| 2006/0056352 A1 | 3/2006 | Proctor |
| 2007/0121560 A1 | 5/2007 | Edge |
| 2007/0140140 A1 | 6/2007 | Feeley et al. |
| 2007/0168405 A1 | 7/2007 | Pomerantz |
| 2007/0197207 A1 | 8/2007 | Carstens et al. |
| 2007/0268846 A1* | 11/2007 | Proctor, Jr. ........ H04B 7/15535 370/279 |
| 2007/0280155 A1 | 12/2007 | Le et al. |
| 2008/0039012 A1* | 2/2008 | McKay ............... H04B 7/1555 455/11.1 |
| 2008/0132164 A1 | 6/2008 | Bugenhagen et al. |
| 2008/0201331 A1 | 8/2008 | Eriksen et al. |
| 2008/0274693 A1 | 11/2008 | Seo et al. |
| 2008/0291846 A1 | 11/2008 | Lu |
| 2009/0158362 A1 | 6/2009 | Kajos |
| 2009/0222624 A1 | 9/2009 | Giacomini et al. |
| 2009/0258655 A1 | 10/2009 | McCarthy et al. |
| 2009/0264093 A1 | 10/2009 | Rothschild |
| 2009/0303034 A1 | 12/2009 | Abedi |
| 2010/0115272 A1 | 5/2010 | Batta |
| 2010/0121940 A1 | 5/2010 | Reeser |
| 2010/0238862 A1* | 9/2010 | Davidson ............ H04W 4/029 370/328 |
| 2011/0221388 A1 | 9/2011 | Low et al. |
| 2011/0255426 A1 | 10/2011 | Gonia et al. |
| 2012/0320824 A1 | 12/2012 | Bari et al. |
| 2013/0007186 A1 | 1/2013 | Liu et al. |
| 2013/0029685 A1 | 1/2013 | Moshfeghi |
| 2013/0035090 A1 | 2/2013 | Moshfeghi |
| 2013/0121161 A1 | 5/2013 | Szabó et al. |
| 2013/0198305 A1 | 8/2013 | Veillette |
| 2013/0204961 A1 | 8/2013 | Fliam et al. |
| 2013/0227048 A1 | 8/2013 | Xie et al. |
| 2014/0031077 A1 | 1/2014 | Weinrib et al. |
| 2014/0119407 A1 | 5/2014 | Miller et al. |
| 2014/0149533 A1 | 5/2014 | Bergman et al. |
| 2014/0169221 A1 | 6/2014 | Cha et al. |
| 2014/0188922 A1 | 7/2014 | Poyhonen et al. |
| 2014/0189034 A1 | 7/2014 | Draznin et al. |
| 2014/0198670 A1 | 7/2014 | Mahasenan et al. |
| 2014/0250230 A1 | 9/2014 | Brueck et al. |
| 2014/0254471 A1 | 9/2014 | Fang et al. |
| 2015/0011236 A1 | 1/2015 | Kazmi et al. |
| 2015/0058488 A1 | 2/2015 | Backholm |
| 2015/0098459 A1 | 4/2015 | Lee et al. |
| 2015/0130552 A1 | 5/2015 | Bhagat et al. |
| 2015/0161872 A1 | 6/2015 | Beaulieu et al. |
| 2015/0227517 A1 | 8/2015 | Lymberopoulos et al. |
| 2015/0271829 A1 | 9/2015 | Amini et al. |
| 2015/0358067 A1 | 12/2015 | Zhang et al. |
| 2016/0183162 A1 | 6/2016 | Jeong et al. |
| 2016/0183271 A1 | 6/2016 | Zhou et al. |
| 2016/0302079 A1* | 10/2016 | Chari ................ H04W 16/26 |
| 2017/0041807 A1 | 2/2017 | Lotter |
| 2017/0041817 A1 | 2/2017 | Shomura et al. |
| 2017/0181006 A1 | 6/2017 | Vardarajan et al. |
| 2017/0272963 A1 | 9/2017 | Rengarajan et al. |
| 2018/0062939 A1* | 3/2018 | Kulkarni ............ H04L 41/0889 |
| 2018/0242103 A1 | 8/2018 | Kish et al. |

OTHER PUBLICATIONS

TP-Link User Guide "TL-WA850RE 300Mbps Universal Wi-Fi Range Extender", retrieved from https://www.mironet.cz/Files/TL-WA850RE_V1.2_UG_EU.pdf (Nov. 14, 2012) 42 pages.

(56) References Cited

OTHER PUBLICATIONS

Lynn, Samara, "Wireless Witch: How to Place a Wireless Extender", retrieved from https://www.pcmag.com/article2/0,2817,2427010,00.asp (Nov. 12, 2013), 5 pages.
Netgear Inc., "Installationsanleitung fUr den Universal WLAN Repeater N/G WN3000RP", retrieved from http://downloades.cdn.re-in.de/1400000-149999/001433183-an-010deNETGEAR_WN3000RP_WLAN_REATER_N300.pdf (Apr. 15, 2012), 16 pages.
International Search Report and Written Opinion dated Aug. 29, 2017 in International Patent Application No. PCT/US2016/065922, 12 pages.

* cited by examiner

2.4 GHz Message 404
SSID = Network

5 GHz Message 408
SSID = Network_5GHz

2.4 GHz Message 412
SSID = Linksys
BSSID = 00-12-17-BA-14-03

5 GHz Message 416
SSID = Linksys_5G
BSSID = 00-12-17-BA-14-04

2.4 GHz Message 420
SSID = default
Security = WPA2-Enterprise

5 GHz Message 424
SSID = default
Security = WPA2-Enterprise

2.4 GHz Message 428
SSID = wireless
VSE = E4200

5 GHz Message 432
SSID = home
VSE = E4200

FIG. 4A

| Detected Wireless Networks 440 |           |
|--------------------------------|-----------|
| Network                        | 2.4 GHz   |
| default                        | 2.4 GHz   |
| Linksys                        | 2.4 GHz   |
| Network_5GHz                   | 5 GHz     |
| Free Public WiFi               | 2.4 GHz   |
| Cable Internet                 | 5 GHz     |
| home                           | 5 GHz     |
| Linksys_5G                     | 5 GHz     |
| wireless                       | 5 GHz     |
| default                        | 5 GHz     |

FIG. 4B

| Detected Wireless Networks 450 |  |
|---|---|
| Network<br>Network_5GHz | 2.4 GHz<br>5 GHz |
| Linksys<br>Linksys_5G | 2.4 GHz<br>5 GHz |
| default | 2.4 GHz<br>5 GHz |
| wireless<br>home | 2.4 GHz<br>5 GHz |
| Free Public WiFi | 2.4 GHz |
| Cable Internet | 5 GHz |

FIG. 4C

OPTIMIZING PLACEMENT OF A WIRELESS RANGE EXTENDER

CROSS-REFERENCES TO RELATED APPLICATIONS

This application is a continuation of U.S. patent application Ser. No. 15/669,696, filed on Aug. 4, 2017, which is a continuation-in-part of U.S. patent application Ser. No. 14/972,480, filed on Dec. 17, 2015. U.S. patent application Ser. No. 15/669,696 is also a continuation-in-part of U.S. patent application Ser. No. 14/294,109, filed on Jun. 2, 2014, now U.S. Pat. No. 9,763,247. U.S. patent application Ser. No. 15/669,696 is also a continuation-in-part of U.S. patent application Ser. No. 14/339,191, filed on Jul. 23, 2014, now U.S. Pat. No. 9,924,513. U.S. patent application Ser. No. 15/669,696 is also a continuation-in-part of U.S. patent application Ser. No. 14/514,628, filed on Oct. 15, 2014, now U.S. Pat. No. 9,794,782. U.S. patent application Ser. No. 15/669,696 is also a continuation-in-part of U.S. patent application Ser. No. 14/493,205 filed on Sep. 22, 2014, now U.S. Pat. No. 10,063,650, which is a continuation of U.S. patent application Ser. No. 14/493,075, filed on Sep. 22, 2014, now U.S. Pat. No. 9,191,374. U.S. patent application Ser. No. 15/669,696 is also a continuation-in-part of U.S. patent application Ser. No. 14/493,199 filed on Sep. 22, 2014, now U.S. Pat. No. 9,936,039, which is a continuation of U.S. patent application Ser. No. 14/493,075, filed on Sep. 22, 2014, now U.S. Pat. No. 9,191,374. U.S. patent application Ser. No. 15/669,696 is also a continuation-in-part of U.S. patent application Ser. No. 14/493,193 filed on Sep. 22, 2014, which is a continuation of U.S. patent application Ser. No. 14/493,075, filed on Sep. 22, 2014, now U.S. Pat. No. 9,191,374. All of these are incorporated by reference in their entireties for all purposes.

FIELD

The present disclosure generally relates to wireless networks and wireless devices. Specifically, various techniques and systems are provided for extending the physical range of a wireless network using a wireless range extender, for self-optimizing the position of a wireless range extender, and for simplification of connection of wireless devices to a wireless access device or wireless gateway device.

BACKGROUND

Wireless range extenders are useful for, among other things, increasing the distance from a wireless access point at which wireless network services provided by the access point can be used by other wireless network devices. Similarly, wireless bridges provide a means for providing wireless connectivity to a wireless access point to network devices that are not capable of wireless transmission.

SUMMARY

Described herein are systems, devices, and techniques for extending wireless networks and associated systems, devices, and techniques for determination of optimal locations of wireless network devices, such as a wireless range extender or wireless bridge device. For example, by evalauating a quality of a wireless signal originating from a wireless access device or access device the systems, devices, and techniques disclosed herein may determine whether an alternative placement of a wireless network device would result in improved quality, speed, and/or reliability. In some implementations, the disclosed systems, devices, and techniques automatically group multiple bands of a single wireless access device in order to simplify connection of wireless devices to a wireless access device.

In an aspect, devices, systems, methods and computer program products are described for association of wireless network devices to two or more wireless networks and for identifying and/or grouping multiple wireless networks corresponding to a single wireless access device, such as a wireless router, gateway or other wireless access device. In an embodiment, a method of this aspect comprises detecting, such as by a wireless network device, a first wireless signal on a first wireless frequency, such a first wireless signal that corresponds to a first network identifier; detecting a second wireless signal on a second wireless frequency different from the first wireless frequency, such as a second wireless signal that corresponds to a second network identifier; determining that the first network identifier and the second network identifier correspond to a same wireless access device; generating a notification, such as a notification that indicates that the first network identifier and the second network identifier correspond to the same wireless access device; and facilitating a display of the notification.

Various techniques are useful for detecting a wireless signal on a wireless frequency. For example, in one embodiment, detecting a wireless signal on a wireless frequency includes transmitting a probe request message on the wireless frequency and receiving a probe response message on the wireless frequency, such as a probe response message that includes a network identifier. In another embodiment, detecting a wireless signal on a wireless frequency includes receiving a wireless beacon message on the wireless frequency, such as a wireless beacon message that includes a network identifier.

Further, various techniques are useful for determining that two network identifiers correspond to the same wireless access device. In one embodiment, determining includes comparing a first message element of the first wireless signal to a second message element of the second wireless signal. Useful message elements include, for example, network identifiers, such as a service set identifier (SSID), a basic service set identifier (BSSID), a source address, etc. Optionally, multiple message elements associated with each wireless signal may be used, which may increase a confidence in the determination that two network identifiers correspond to the same wireless access device. Useful message elements also or alternatively optionally include a vendor specific element. Optionally, determining includes matching at least a portion of the first network identifier to at least a portion of the second network identifier. Optionally, determining includes matching a first portion of a first BSSID of the first wireless signal to a second portion of a second BSSID of the second wireless signal. Optionally, determining includes matching at least a portion of a first vendor specific element of the first wireless signal to at least a portion of a second vendor specific element of the second wireless signal. Optionally, matching at least a portion of a first SSID of the first wireless signal to at least a portion of a second SSID of the second wireless signal.

In some embodiments, determining that two network identifiers correspond to the same wireless access device may include comparing passwords or security protocols needed to connect to wireless networks corresponding to the two network identifiers. For example, a method of this aspect may further comprise receiving input corresponding to determination of a password needed for establishing a first wireless association between the wireless network device and the wireless access device using the first network identifier. Optionally, the input may be user provided. Optionally, a method of this aspect further comprises establishing the first wireless association between the wireless network device and the wireless access device using the first network identifier and the password. Optionally, determining includes establishing a second wireless association between the wireless network device and the wireless access device using the second network identifier and the password. Optionally, a method of this aspect further comprises receiving input corresponding to determination of a security protocol needed for establishing the first wireless association using the first network identifier. Optionally, a method of this aspect further comprises establishing the first wireless association between the wireless network device and the wireless access device using the first network identifier, the password, and the security protocol. Optionally, determining includes establishing a second wireless association using the second network identifier, the password, and the security protocol. As used herein, the term "password" may be used interchangeably with the terms "passcode" and "passphrase" without departing from the spirit of the invention.

Notifications useful with the methods of this aspect can take on a variety of forms. For example, in one embodiment, the notification includes a listing of network identifiers grouped, linked, color coded, positioned, or otherwise arranged according to corresponding access devices. Optionally, the notification includes a listing of network identifiers and signal strength indicators corresponding to the network identifiers. Optionally, a display of the notification is facilitated by generating a display of the notification, such as directly on a display of the wireless network device, such as a liquid crystal display or e-ink display. Optionally, generating the notification includes generating a web page including the notification. Optionally, facilitating the display of the notification includes transmitting the web page. In an exemplary embodiment, receiving the web page at a network device facilitates the network device displaying the web page including the notification, such as on a display associated with the network device, like a monitor or touch-screen interface of the network device.

In various embodiments, methods of this aspect include establishing a wireless association between the wireless network device and the access device. For example, a user may provide input identifying which wireless networks of an access device to associate with and then the wireless network device may proceed with association. In this way, the wireless network device may extend or provide access to the wireless network provided by the access device to other wired or wireless network devices. In one embodiment, for example, a method of this aspect further comprises receiving input corresponding to a determination of the wireless access device, such as where the wireless access device corresponds to the first network identifier, the second network identifier, or both the first network identifier and the second network identifier; and establishing a wireless association between the wireless network device and the wireless access device using the first network identifier or the second network identifier.

Optionally, the wireless network device may establish separate wireless associations with the wireless access device on multiple frequencies. In this way, the wireless network device can be used for extending network access using each of the multiple frequencies. In one embodiment, a method of this aspect further comprises receiving input corresponding to a determination of the wireless access device, wherein the wireless access device corresponds to the first network identifier and the second network identifier; establishing a first wireless association between the wireless network device and the wireless access device using the first network identifier and the first wireless frequency; establishing a second wireless association between the wireless network device and the wireless access device using the second network identifier and the second wireless frequency.

Optionally, the extended wireless network access provided by the wireless network device to other network devices may be provided on the same or different wireless frequencies and/or channels. Optionally the extended wireless network access provided by the wireless network device to other network devices may utilize the same access credentials, such as SSID and password/passphrase. Use of the same wireless credentials allows simplification of connection of other network devices to the wireless network device, as the other network devices may wirelessly roam from the base access device to the wireless network device providing extended service, allowing a seamless user experience.

In various implementations, systems embodying the above aspect are provided, such as systems for performing the methods described above. A specific system embodiment comprises one or more data processors; and a non-transitory computer-readable storage medium containing instructions which when executed on the one or more data processors, cause the one or more data processors to perform operations including: detecting, by a wireless network device, a first wireless signal on a first wireless frequency, such as a first wireless signal that corresponds to a first network identifier; detecting a second wireless signal on a second wireless frequency different from the first wireless frequency, such as a second wireless signal that corresponds to a second network identifier; determining that the first network identifier and the second network identifier correspond to a same wireless access device; generating a notification, such as a notification that indicates that the first network identifier and the second network identifier correspond to the same wireless access device; and facilitating a display of the notification. It will be appreciated that any of the variations on the methods described above may be implemented on the systems provided.

In embodiments, computer-program products of the above aspect are provided, such as a computer-program product tangibly embodied in a non-transitory machine-readable storage medium, including instructions configured to cause a computing device to perform operations including detecting a first wireless signal on a first wireless frequency, such as a first wireless signal that corresponds to a first network identifier; detecting a second wireless signal on a second wireless frequency different from the first wireless frequency, such as a second wireless signal that corresponds to a second network identifier; determining that the first network identifier and the second network identifier correspond to a same wireless access device; generating a notification, such as a notification that indicates that the first network identifier and the second network identifier correspond to the same wireless access device; and facilitating a display of the notification. It will be appreciated that any of the variations on the methods of the related aspect may be implemented as a computer program product.

In some embodiments, after identification of a wireless network, such as by receiving input corresponding to a determination of one or more wireless network identifiers, a wireless range extender may associate with one or more wireless networks of a wireless access device corresponding to the network identifiers and serve to provide wireless access to the wireless networks. In this way, the wireless range extender can extend the usable area for a wireless network, such as by being positioned at a location within wireless range of the wireless access device and provide wireless access to other devices that are positioned further from the wireless access device where they may not be in range of the wireless access device but may be in range of the wireless range extender.

In another aspect, devices, systems, methods and computer program products are described for optimal positioning of a wireless network device, such as a wireless range extender or wireless bridge. In an embodiment, a method of this aspect comprises receiving, at a wireless network device, input corresponding to a determination of a wireless access device; detecting a wireless signal, such as a wireless signal that corresponds to the wireless access device; determining a quality of the wireless signal; comparing the quality of the wireless signal to a threshold value; generating a notification based on the comparison, such as a notification that includes instructions for positioning the wireless network device; and facilitating displaying the notification. Optionally, receiving input corresponding to a determination of a wireless access device includes receiving input corresponding to determination of a network identifier. In embodiments, the methods described above for identifying and/or grouping multiple wireless networks corresponding to a single wireless access device may be implemented in determination of the wireless access device.

Various techniques are useful for detecting the wireless signal. For example, in one embodiment, detecting the wireless signal includes establishing a wireless association between the wireless network device and the wireless access device. Optionally, detecting the wireless signal includes transmitting a probe request message; and receiving a probe response message, such as a probe response message that corresponds to the wireless access device. Optionally, detecting the wireless signal includes receiving a wireless beacon message, such as a wireless beacon message that corresponds to the wireless access device.

It will be appreciated that any of a variety of quality metrics are useful with methods of this aspect. Although not so limited, in one embodiment, the quality of the wireless signal corresponds to a measure of the received power of the wireless signal. For example, the quality may correspond to a received signal strength indication (RSSI). In one embodiment, the measure of the received power of the wireless signal is greater than or equal to −50 dBm and the notification includes instructions to move the wireless network device away from the wireless access device. In another embodiment, the measure of the received power of the wireless signal is less than or equal to −75 dBm and the notification includes instructions to move the wireless network device closer to the wireless access device. In another embodiment, the measure of the received power of the wireless signal is between −75 dBm and −50 dBm and the notification includes instructions to keep the wireless network device at the current distance from the wireless access device.

Optionally, quality of the wireless signal corresponds to one or more of: a measure of the received signal strength of the wireless signal, a received channel power indicator of the wireless signal, a received power of the wireless signal, a signal to noise ratio of the wireless signal, a noise margin of the wireless signal, a wireless signal travel time between the wireless access device and the wireless network device, an average connection speed during wireless association between the wireless network device and the wireless access device, a number of detected wireless devices operating on a same channel as the wireless access device, a statistical measure of a characteristic of a wireless association between the wireless network device and the wireless access device, a packet drop rate, an average throughput, determination of a distance between the wireless access device and the wireless network device.

In embodiments, the wireless network device has power removed during a process of optimizing placement of the device, such as by a user in order to position the wireless network device at a new location. Preferably, the user moves the wireless network device according to information included in the notification. When power is resumed, for example, embodiments of methods of this aspect resume performance. For example, in one embodiment, a method of this aspect further comprises detecting removal of and/or restoration of power to the wireless network device and resuming performance of the method thereafter. Optionally, methods of this aspect further comprise detecting a new wireless signal, such as a new wireless signal that corresponds to the wireless access device; determining a new quality of the new wireless signal; making a new comparison of the new quality of the wireless signal to the threshold value; generating a new notification based on the new comparison, such as a new notification that includes instructions for positioning the wireless network device, such as to position the wireless network device at a different distance from the wireless access device or to keep the wireless network device at a current distance from the wireless access device; and facilitating displaying the new notification. In this way, the wireless network device may evaluate the quality of the wireless signal upon restoration of the power to the wireless network device at a new position and determine whether the wireless signal quality for the new location is sufficient.

In various embodiments, the wireless network device may monitor a quality of a wireless signal or wireless association for a period of time, such as to establish statistical information about the wireless network and quality of the wireless signals from the wireless network at the position of the wireless network device. After the statistical information is obtained, this information can be evaluated to determine whether another position for the wireless network device might provide a higher or more suitable quality signal. For example, wireless interference may be sporadic and so an initial quality determination may not be indicative of the true performance of a wireless association over a longer term during which the wireless interference is present. It will be appreciated that a variety of conditions may result in wireless interference, such as presence and/or operation of other wireless devices, presence and/or operation of other electronic devices, such as microwaves, presence and/or orientation of obstructions, etc., and that these conditions may change as a function of time.

In one embodiment, a method of this aspect further comprises establishing a wireless association with the wireless access device; monitoring a characteristic of the wireless association; determining a statistical measure of the characteristic of the wireless association; generating a new notification using the statistical measure, such as a new notification that includes instructions for positioning the wireless network device; and facilitating displaying the new notification.

The notification for positioning the wireless network device may be provided in a variety of forms. For example, in one embodiment, the notification may take an optical form, such as a light present on the wireless network device, or an audible form, such as a sound emitted by the wireless network device. Optionally, facilitating displaying the notification includes changing a display of one more lights of the wireless network device or of another network device. Optionally, facilitating displaying the notification includes displaying the notification on a display of the wireless network device or of another network device. Optionally, facilitating displaying the notification includes generating an audible signal using a speaker of the wireless network device or of another network device. In one embodiment, the notification takes a form representing a direction to move the wireless network device, such as a word or other sound or symbol indicating whether to move the wireless network device closer to or further from the wireless access device. In another embodiment, the notification takes a form representing optimal placement of the wireless network device, such as a word or other sound or symbol indicating that the wireless network device does not need to be moved.

In an exemplary embodiment, the notification includes instructions to place the wireless network device at a different distance from the wireless access device or to keep the wireless network device at a current distance from the wireless access device. Optionally, the notification includes instructions to move the wireless network device toward the wireless access device. Optionally, the notification includes instructions to move the wireless network device away from the wireless access device.

Optionally, generating the notification includes determining that the quality of the wireless signal is greater than a low threshold value; and determining that the quality of the wireless signal is greater than a high threshold value. Optionally, the notification includes instructions to move the wireless network device away from the wireless access device.

Optionally, generating the notification includes determining that the quality of the wireless signal is smaller than a low threshold value; and determining that the quality of the wireless signal is smaller than a high threshold value. Optionally, the notification includes instructions to move the wireless network device closer to the wireless access device.

Optionally, generating the notification includes determining that the quality of the wireless signal is greater than a low threshold value; and determining that the quality of the wireless signal is smaller than a high threshold value. Optionally, the notification includes instructions to keep the wireless network device at the current distance from the wireless access device.

Optionally, the notification is included on a web page displayed by the wireless network device or another network device. In an embodiment, for example, generating includes generating a web page including the notification. Optionally, facilitating displaying the notification includes transmitting the web page. Optionally, receiving the web page at a network device facilitates the network device displaying the web page including the notification.

In some embodiments, a wireless network device is capable of and/or configured for associating with wireless access devices on multiple wireless frequencies. It will be appreciated that different frequency wireless signals may have different propagation characteristics. For example, in some configurations, a 2.4 GHz wireless signal will propagate further than a similar 5 GHz wireless signal, such as a 5 GHz wireless signal that has a same transmission power as the 2.4 GHz wireless signal. Accordingly, a device positioned optimally for receiving a first wireless signal at a first frequency may not be positioned optimally for receiving a second wireless signal at a second frequency different from the first frequency. Aspects described herein are useful, for example, for determining an optimal location for a dual-frequency wireless network device.

For example, in one embodiment, detecting a wireless signal includes detecting a first wireless signal corresponding to the wireless access device, such as where the first wireless signal corresponds to a first wireless frequency and detecting a second wireless signal corresponding to the wireless access device, such as where the second wireless signal corresponds to a second wireless frequency. Optionally, determining the quality of a wireless signal includes determining a first quality of the first wireless signal and determining a second quality of the second wireless signal. Optionally, generating the notification includes determining whether the first quality of the first wireless signal is less than or greater than a first threshold value and determining whether the second quality of the second wireless signal is less than or greater than a second threshold value. In some embodiments, a method of this aspect further comprises establishing a first wireless association with the wireless access device using the first wireless frequency and establishing a second wireless association with the wireless access device using the second wireless frequency.

Optionally, detecting the wireless signal includes detecting a first wireless network operating on a first wireless frequency, such as where the first wireless network corresponds to a first network identifier detecting a second wireless network operating on a second wireless frequency, such as where the second wireless network corresponds to a second network identifier, and determining that both the first network identifier and the second network identifier correspond to the wireless access device.

Various wireless network devices are useful with the methods, systems and products described herein. Useful wireless network devices include those for making a wireless connection with a wireless access device, such as a wireless router, a wireless access point, or a wireless gateway, and providing wireless network connectivity to other network devices, such as using an additional wired or wireless network connection. For example, in one embodiment, the wireless network device is a wireless range extender. Optionally, the wireless network device is a wireless repeater. In an embodiment, the wireless network device is a wireless bridge. Optionally, the wireless network device is a wireless access point. In this way, the range of a wireless access device can be extended to additional wired or wireless network devices.

In embodiments, wireless network devices may be compliant with one or more Institute of Electrical and Electronics Engineers (IEEE) wireless networking standards or amendments, such as 802.11-2007, 802.11-2012, 802.11n, 802.11ac, etc. Optionally, various wireless frequencies are useful with the methods of this aspect, such as those suitable for use by a wireless network device or prescribed by an IEEE 802.11 standard, such as one or more frequencies within a 2.4 GHz band and/or one or more frequencies within a 5 GHz band. It will be appreciated that channel and frequency assignments available for use may be prescribed by local regulatory agencies, such as the Federal Communications Commission (FCC) in the United States. Further, it will be appreciated that various channel numbers and widths may be used by a wireless network device. In one embodiment, a first wireless frequency corresponds to 2.4 GHz, or a channel or channel range thereof, and a second wireless frequency corresponds to 5 GHz, or a channel or channel range thereof. In another embodiment, a first wireless frequency corresponds to a first 5 GHz channel or channel range and a second wireless frequency corresponds to a different 5 GHz channel or channel range. Optionally, a third wireless frequency corresponds to a 2.4 GHz channel or channel range.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 4A provides a summary of example messages received by a wireless network device, in accordance with some embodiments. FIG. 4B provides an example notification listing detected wireless networks, in accordance with some embodiments. FIG. 4C provides an example notification listing detected wireless networks, in accordance with some embodiments.

DETAILED DESCRIPTION

Figure 1:
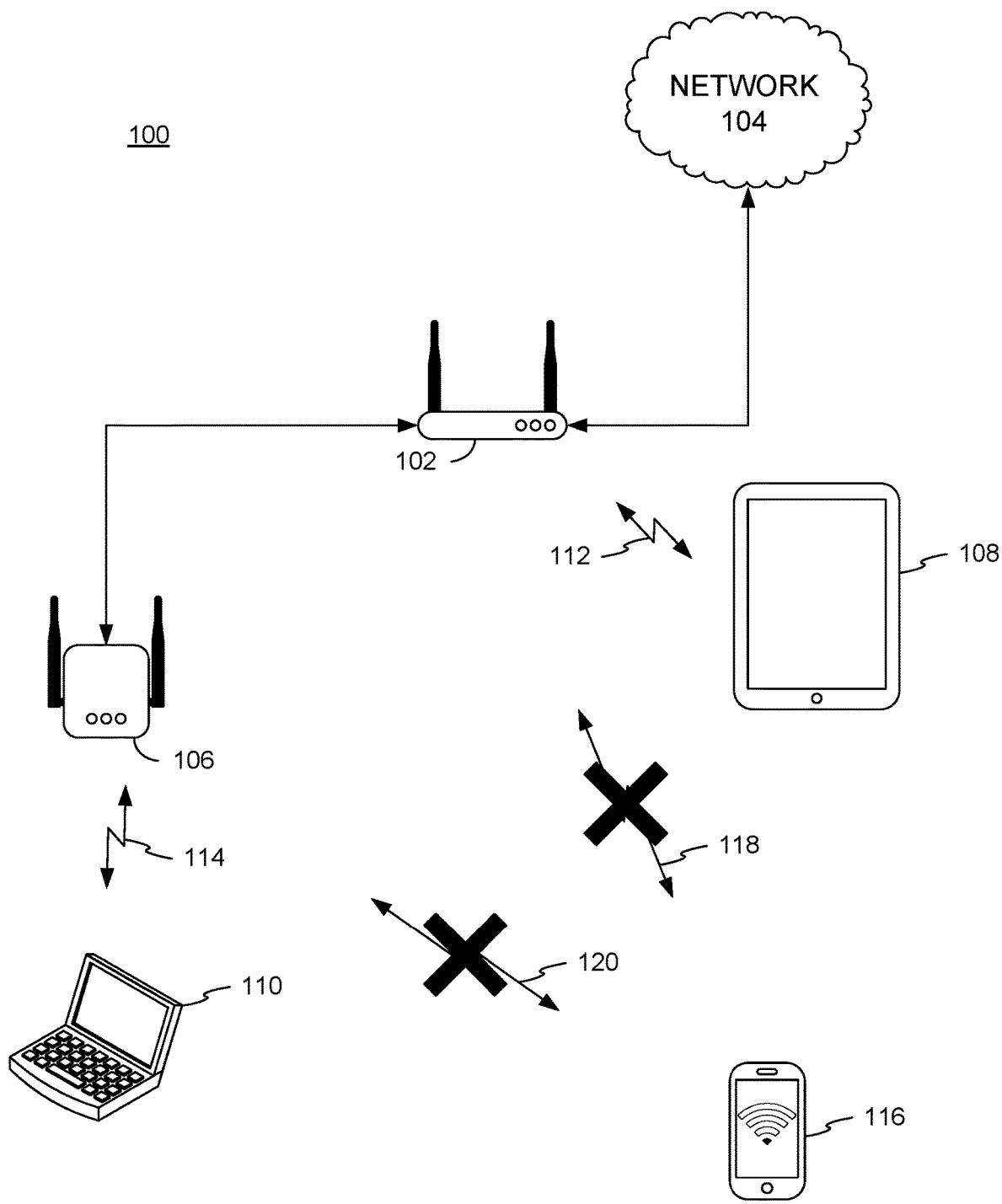
FIG. 1 provides an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an network device user with access to various devices connected to the network. For example, a network may include one or more gateways or access devices (e.g., access points, router, range extenders, bridges, etc.) that allow client devices to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using a network within the local area network or remotely from the local area network.

Devices within the local area network may include a network gateway, such as a wired or wireless access device, a wired or wireless router, a wireless range extender, a wireless bridge, and client devices. It will be appreciated that devices attached to, associated with or otherwise connected to the local area network may exchange network communications with one another using a wired or wireless medium, depending on the specific network interfaces present within the devices. In some embodiments, a network device includes one or more wired network interfaces and one or more wireless network interfaces. It will be appreciated that various network interfaces may be implemented within wireless devices, such as network interfaces compliant with one or more Institute of Electrical and Electronics Engineers (IEEE) standards or specifications, such as IEEE 802.3 or IEEE 802.11.

For example, a typical wireless router used in a home local area network may include a first wired interface for establishing a wired network connection with a gateway device, such as a cable, DSL, cellular, or fiber optic modem, which may provide network access to a wide area network, such as the Internet. The wireless router may further include one or more additional wired interfaces for establishing wired network connections with one or more client or intermediate network devices, such as a hub, switch, personal computer, set top box, video game console, Voice Over Internet Protocol (VOIP) phone, access points, and the like. The wireless router may further include one or more wireless interfaces for establishing wireless network connections with one or more client or intermediate network devices, such as a laptop, smartphone, set top box, video game console, wireless repeater, wireless bridge, wireless range extender, and the like. In some embodiments, a wireless router may include a first wireless interface that operates on a first frequency, such as using the 2.4 GHz band associated with IEEE 802.11 devices, and a second wireless interface that operates on a second frequency, such as such as using the 5 GHz band associated with IEEE 802.11 devices. In this way, the wireless router may be useful for providing network access to any of a range of network devices.

FIG. 1 illustrates an example of a local area network 100. The local area network 100 includes a wireless access device 102, which provides network connectivity to network 104, such as over a wired or wireless interface, to various other network devices. Local area network 100 further includes a second wireless access device 106, which is illustrated in wired network communication with wireless access device 102. Various wireless network devices are further included in local area network 100, including tablet computer 108 and laptop 110. Tablet computer 108 is connected to wireless access device 102 by wireless network connection 112, for example. Laptop 110 is connected to the second wireless access device 106 by wireless network connection 114, for example. A smartphone 116 is illustrated as in the vicinity of local area network 100, but positioned at a location outside of a wireless range of wireless access device 102 or second wireless access device 106, such that smartphone 116 is unable to establish a wireless connection 118 or 120 with either access point.

Figure 2:
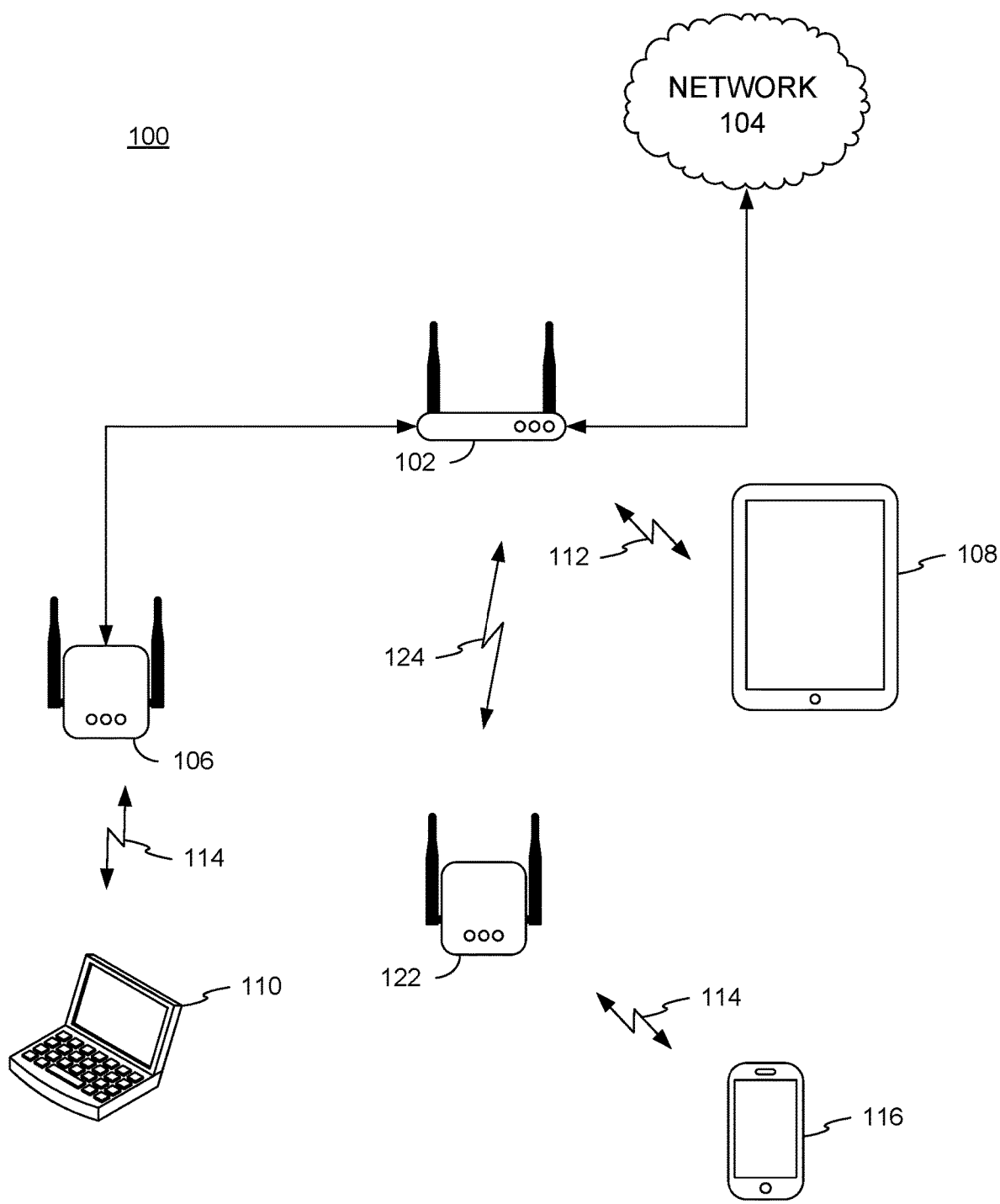
FIG. 2 provides an illustration of an example of a network environment, in accordance with some embodiments.

One solution for providing wireless connectivity to smartphone 116 is illustrated in FIG. 2. There, an intermediate wireless network device, such as a wireless range extender 122, is positioned between wireless access device 102 and smartphone 116. Wireless range extender 122 may make one or more wireless network connections 124 with wireless access device 102 and also make a wireless network connection 126 with smartphone 116 in order to provide network access to local area network 100 to smartphone 116. It will be appreciated that wireless range extender 122 may alternatively or additionally establish a wireless network connection with second wireless access point 106. It will further be appreciated that wireless range extender 122 may function alternatively or additionally as a wireless bridge and provide connectivity via wireless network connection 124 to local area network 100 to one or more network devices over a wired network interface.

It will also be appreciated that the local area network 100 may have other components than those depicted. Further, the embodiments shown in the figures are only examples of local area networks that may incorporate embodiments of the invention. In some other embodiments, local area network 100 may have more or fewer components than shown in the figure, may combine two or more components, or may have a different configuration or arrangement of components.

The local area network 100 may include a wireless network or a combination of wired and wireless networks, as illustrated. A wireless network may include any wireless interface or combination of wireless interfaces (e.g., Zigbee™, Bluetooth™, Wi-Fi™, IR, cellular, long-term evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100.

The network 104, to which access is provided by wireless access device 102, may be of any type of network that can support data communications using any of a variety of commercially-available protocols and using one or more gateway devices, such as a cable modem, wireless modem, DSL modem, fiber optic network modem, etc. Network 104 may include one or more external networks, such as a cloud network, the Internet, and/or other wide area networks. In certain embodiments, services provided by the network 104 may include a host of services that are made available to users, such as registration and access control of network devices included in local area network 100. For example, the network 104 may host an application, and a user may, via a communication network such as the Internet, use the application.

Optionally, upon being powered on or reset, any one or more of the network devices included in local area network 100 may be registered with a server present in network 104, such as a server of a cloud service provider. For example, services may be provided by a cloud service provided that allow control over network devices present within local area network 100 from anywhere that access to the cloud service provider may be obtained. In this way, a user may monitor or control devices such as the wireless access device 102, second wireless access device 106, tablet computer 108, laptop 110, wireless range extender 122, and other network devices, from any location inside or outside of local area network 100 where access to the cloud service provider may be obtained.

Figure 3A:
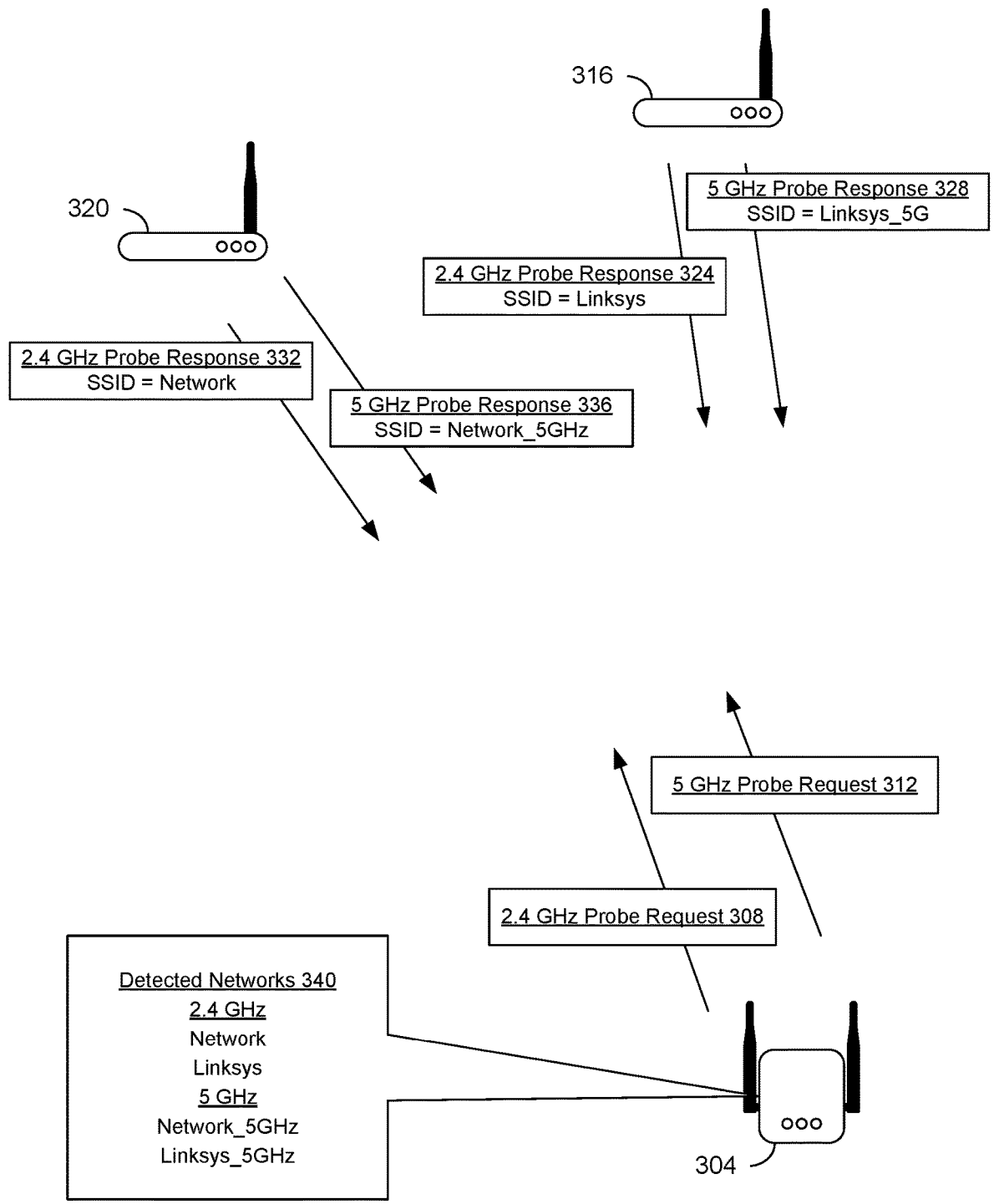
FIG. 3A and FIG. 3B provide overviews of exchange of wireless messages between network devices, in accordance with some embodiments.
Figure 3B:
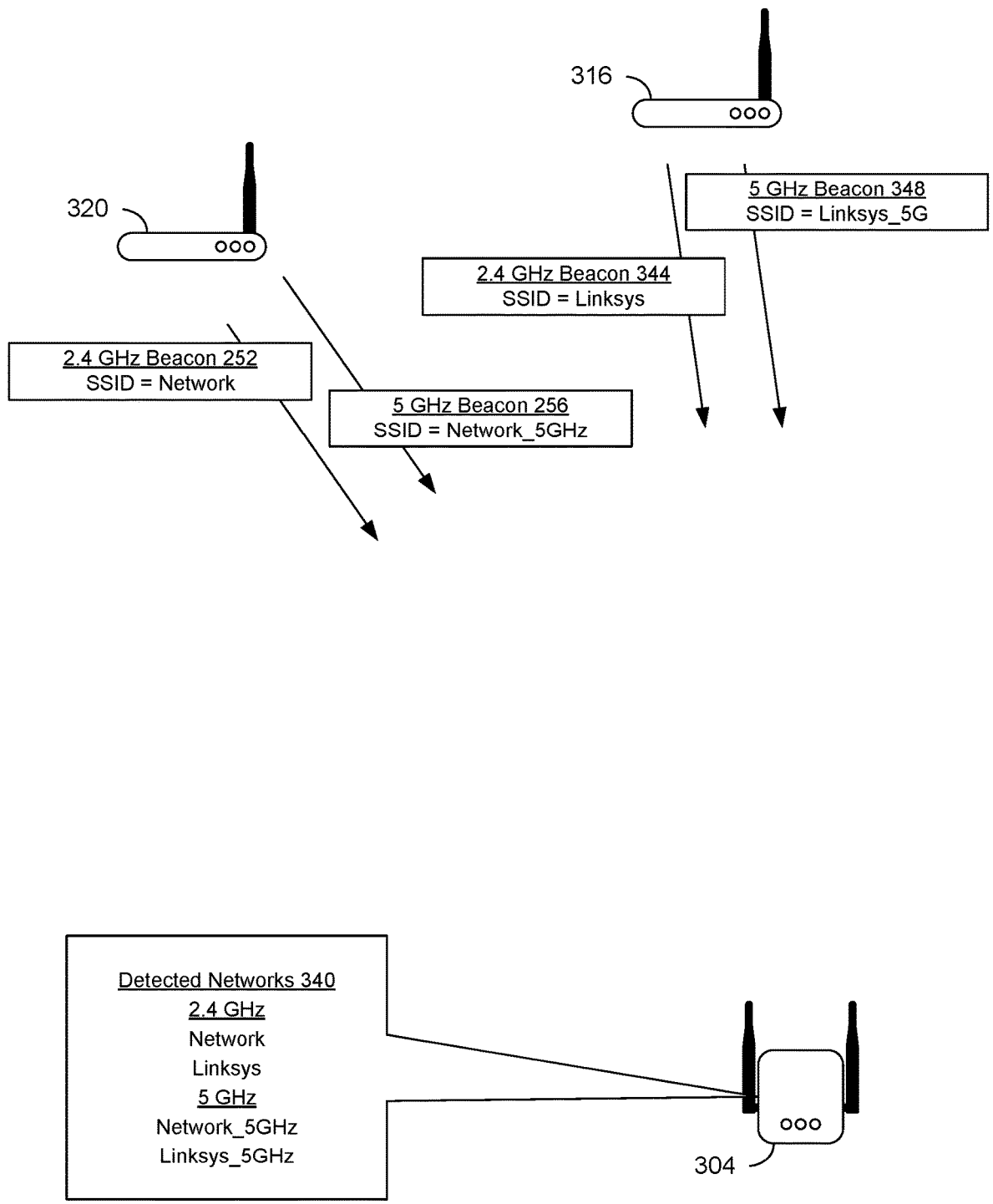

The process of associating a wireless network device, such as a wireless range extender, with a wireless network begins, in some embodiments, by the wireless network device detecting wireless networks operating in the vicinity of the wireless network device. FIGS. 3A and 3B illustrate two processes by which a wireless range extender may detect nearby wireless networks. As illustrated in FIG. 3A, wireless range extender 304 may actively scan for nearby wireless networks by transmitting one or more probe request messages on each of the wireless bands it may be compatible with, such as 2.4 GHz probe request 308 and 5 GHz probe request 312. It will be appreciated that probe requests 308 and 312 may conform to one or more wireless network specifications, such as an IEEE 802.11 specification, and may comprise, for example, a wireless management frame requesting information about the wireless networks that detect the transmitted frame. Wireless access devices 316 and 320 may be present in a detection range of the transmitted probe requests 308 and 312 and respond accordingly with one or more probe responses. For example, wireless access device 316 responds by transmitting a 2.4 GHz probe response 324 and a 5 GHz probe response 328, and wireless access device 320 responds by transmitting a 2.4 GHz probe response 332 and a 5 GHz probe response 334. It will be appreciated that probe responses 324, 328, 332, and 334 may also conform to one or more wireless network specifications, such as an IEEE 802.11 specification, and may comprise, for example, a wireless management frame providing information about the wireless networks operated by the access devices. Probe responses 324, 328, 332, and 334 may include information about the wireless access device or wireless network, such as a network identifier, like a service set identifier (SSID), a basic service set identifier (BSSID), and/or an internet protocol (IP) address, rate information, channel information, etc., and vendor specific information. As illustrated, wireless range extender 304 receives the probe responses 324, 328, 332, and 336 and assembles a list of detected networks 340.

FIG. 3B illustrates a passive scanning technique in which wireless range extender 304 listens for nearby wireless networks that transmit one or more beacon messages on each of the wireless bands it may be compatible with, such as for 2.4 GHz beacon messages and 5 GHz beacon messages. It will be appreciated that the beacon messages may conform to one or more wireless network specifications, such as an IEEE 802.11 specification, and may comprise, for example, a wireless management frame providing information about the wireless networks operated by the access devices. Beacon messages may include information about the wireless access device or wireless network, such as a network identifier, like a service set identifier (SSID), a basic service set identifier (BSSID), and/or an internet protocol (IP) address, rate information, channel information, etc., and vendor specific information. As illustrated, wireless access device 316 transmits a 2.4 GHz beacon 344 and a 5 GHz beacon 348, and wireless access device 320 transmits a 2.4 GHz beacon 352 and a 5 GHz beacon 356. Upon wireless range extender 304 receiving the beacons 344, 348, 352, and 356, wireless range extender 304 assembles a list of detected networks 338.

FIG. 4A provides an exemplary summary of messages 404, 408, 412, 416, 420, 424, 428, and 432, which are received by a wireless network device. As illustrated, various message elements are depicted in messages 404, 408, 412, 416, 420, 424, 428, and 432, which may be used by a wireless network for further analysis. As will be appreciated from the foregoing disclosure, messages 404, 408, 412, 416, 420, 424, 428, and 432 may correspond to beacon messages and/or probe response messages, for example.

In a conventional wireless network device, the wireless network device may generate a notification 440 listing each of the wireless networks detected, such as is depicted in FIG. 4B. Here, the detected wireless networks may be presented in a list that is sorted, for example, according to detected signal strength, as shown by the signal strength indicators on the right. If two networks are depicted as having the same detected signal strength, a secondary sort order may be used, such as an alphabetical sorting based on detected SSID. It will be appreciated that other sorting options may be utilized.

As will be understood in view of the present disclosure, the wireless network device may alternatively identify wireless networks that are associated with the same access device and group those network originating from the same access device for presenting in a notification. FIG. 4C illustrates a listing of access devices grouped in this way. Various techniques may be implemented for determining that the different wireless networks are associated with the same access device. For example, the wireless network device may determine that all or a portion of network identifiers for two or more detected networks match and thereby determine that the networks are associated with the same access device. For example, from FIG. 4A, it may be determined that message 404 and message 408 have SSIDs that match, at least in part, and therefore the networks corresponding to these SSIDs are associated with the same access device. As another example, it may be determined that message 412 and message 416 may have SSIDs and/or BSSIDs that match, in part, and therefore the network corresponding to these messages are associated with the same access device. As another example, it may be determined that message 420 and message 424 may have SSIDs and/or security protocols that match, and therefore the network corresponding to these messages are associated with the same access device. As a further example, it may be determined that message 428 and message 4432 may have vendor specific elements (VSEs) that match, and therefore the network corresponding to these messages are associated with the same access device. In addition, combinations of factors may be used in determining that two networks are associated with the same access device. The grouped networks may be sorted according to one or more sorting conditions for display in the notification 450. The notification may include information in addition to that shown in FIG. 4C, such as vendor information about the wireless access device, such as a manufacturer, model, etc. Such information may be useful to a user in aiding the determination of which access device is the one that a wireless network device is to associate with.

Figure 5:
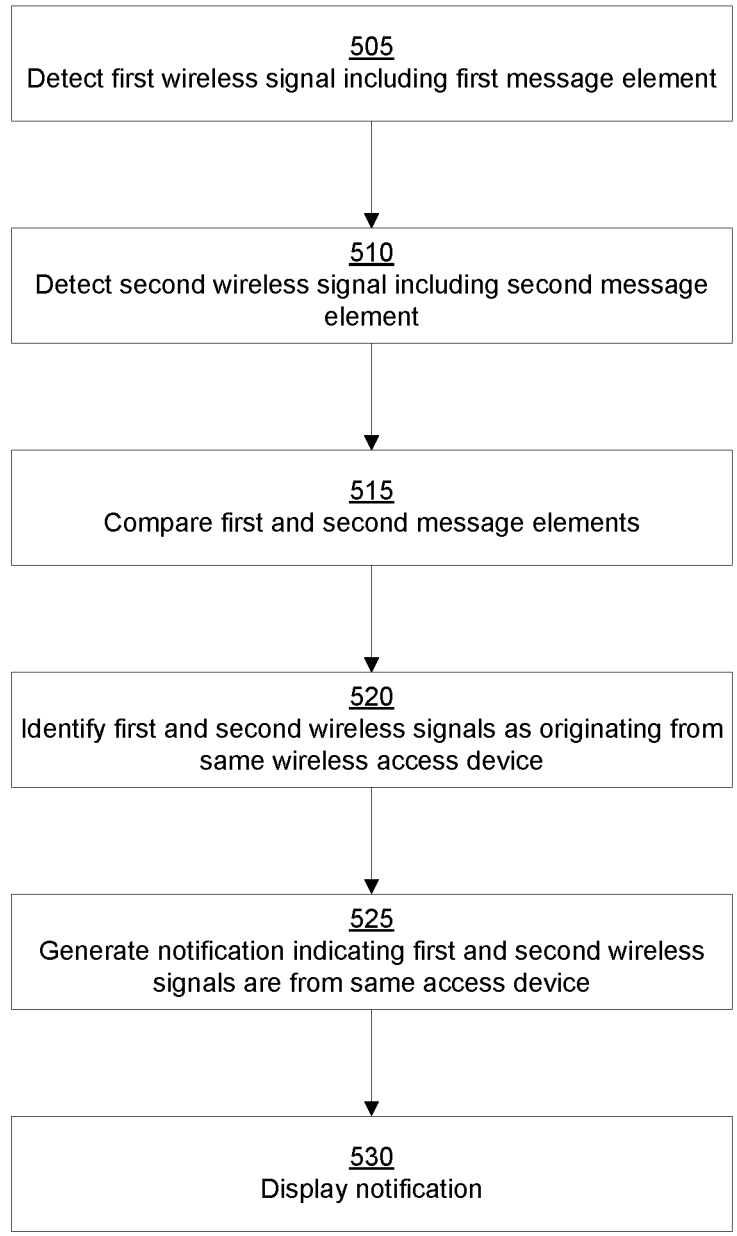
FIG. 5 provides a flowchart illustrating an embodiment of a process for detecting a plurality of wireless networks.

FIG. 5 provides an overview of a method for detecting a plurality of wireless networks. At block 505, a first wireless signal including a first message element is detected. A message element may include one or more components of a wireless data frame, such as a beacon frame, probe response frame, or other 802.11 management frame, for example. At block 510, a second wireless signal including a second message element is detected. At block 515, the first and second message elements are compared. The comparison may indicate that all or portions of the message elements are the same or different. This comparison may be later utilized, such as in block 520 where the first and second wireless signals are identified as originating from the same wireless access device. At block 525 a notification is generated indicating that the first and second wireless signals are from the same access device. Notifications may include, for example, a webpage or other message that in some way identifies the wireless signals as originating from the same access device. At block 530, the notification is displayed, such as on a display of a wireless network device, using a web browser associated with the wireless network device, etc.

A user operating the wireless network device may optionally provide input identifying a wireless access device to associate with. For example, as displayed in FIG. 4C, the user may provide input corresponding to a determination of the wireless access device associated with the networks having the SSIDs of "Network" and "Network_5 GHz". Such input may be provided using one or more input devices of the wireless network device. Depending on the configuration of the wireless network device, the wireless network device may establish a wireless association with the access device, such as using one or both of the SSIDs identified. It will be appreciated that various other inputs may be required for establishing a wireless association, such as a password, passphrase, credentials, etc.

Figure 6:
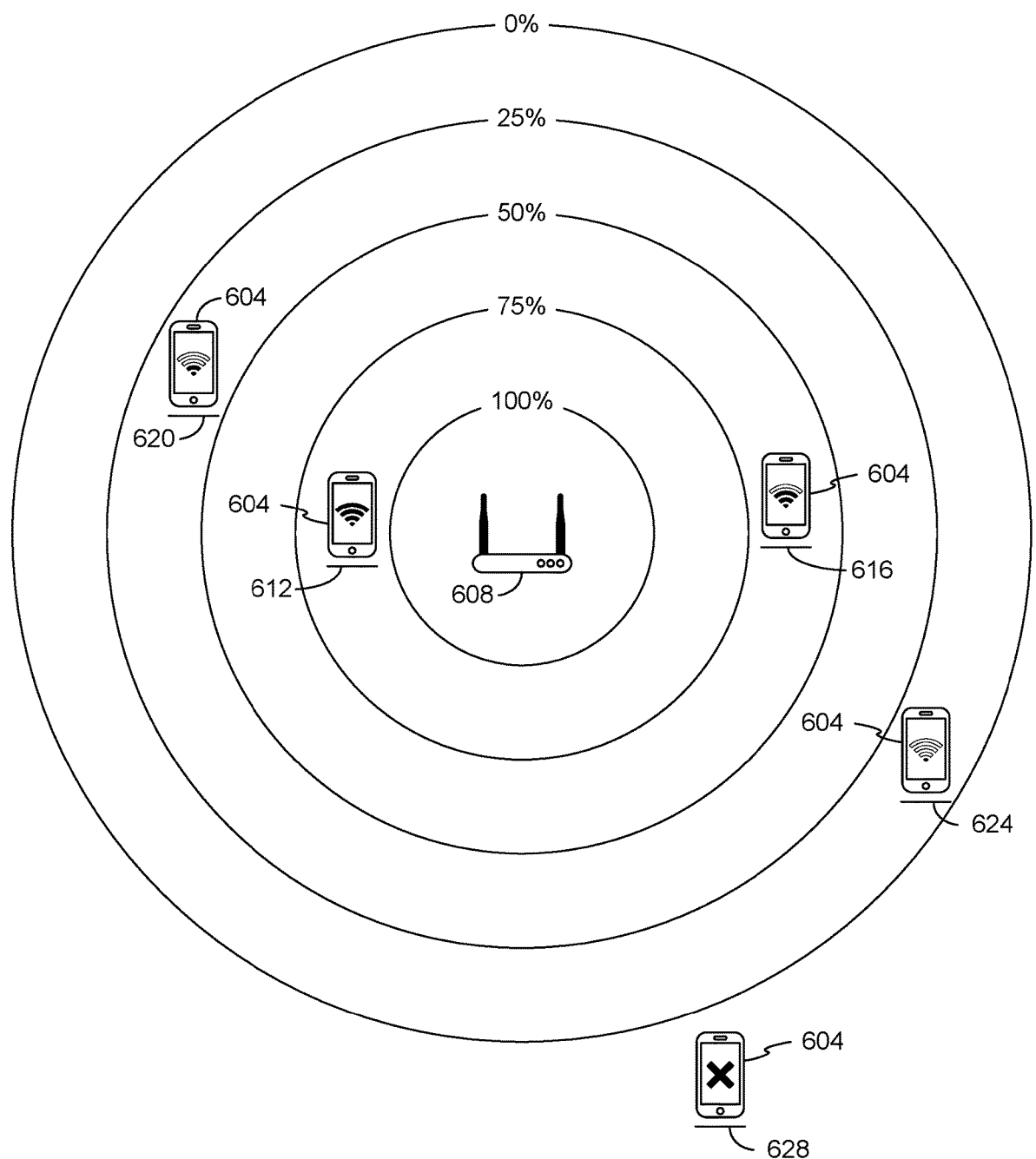
FIG. 6 provides an illustration of an example of a network environment, in accordance with some embodiments.

In some embodiments, a wireless network device may be positioned outside of the detectable or usable wireless range of an access device. FIG. 6 displays a schematic illustration of an example network environment showing a smartphone 604 operating at various locations relative to a wireless access point 608. Gradations are illustrated in FIG. 6 providing example relative wireless signal strengths that may be detected at distances from wireless access point 608. At a location 612 close to wireless access point 608, smartphone 604 may detect a strong wireless signal and display a signal meter with full bars—4 bars as depicted in FIG. 6. At a slightly more distant location 616 from wireless access point 608, smartphone 604 may detect a wireless signal and display a signal meter with 3 bars. At a further distant location 620 from wireless access point 608, smartphone 604 may detect a wireless signal and display a signal meter with 2 bars. At a yet further distant location 624 from wireless access point 608, smartphone 604 may detect a wireless signal and display a signal meter with 1 bars. At a still further distant location 628 from wireless access point 608, smartphone 604 may not detect a wireless signal from wireless access point 608, and display a signal meter with 0 bars or some other indication of no signal received. It will be appreciated that the signal meter displayed is merely exemplary and serves to provide a measure of the relative detected signal strength. Various implementations are possible.

FIGS. 7A-7E provide schematic illustrations of an example network environment showing a smartphone 704 positioned at a distance from a wireless access point 708. FIGS. 7B-7E further depict a wireless range extender 712 positioned at various locations relative to smartphone 704 and wireless access point 708. Gradations are illustrated in FIGS. 7A-7E showing relative wireless signal strengths that may be detected from wireless access point 708 and wireless range extender 712. It should again be appreciated that the gradations illustrated are merely exemplary and represent only one implementation. Other signal strength indicators can be conceived and it may be possible that the signal reach of different devices may be different.

Figure 7A:
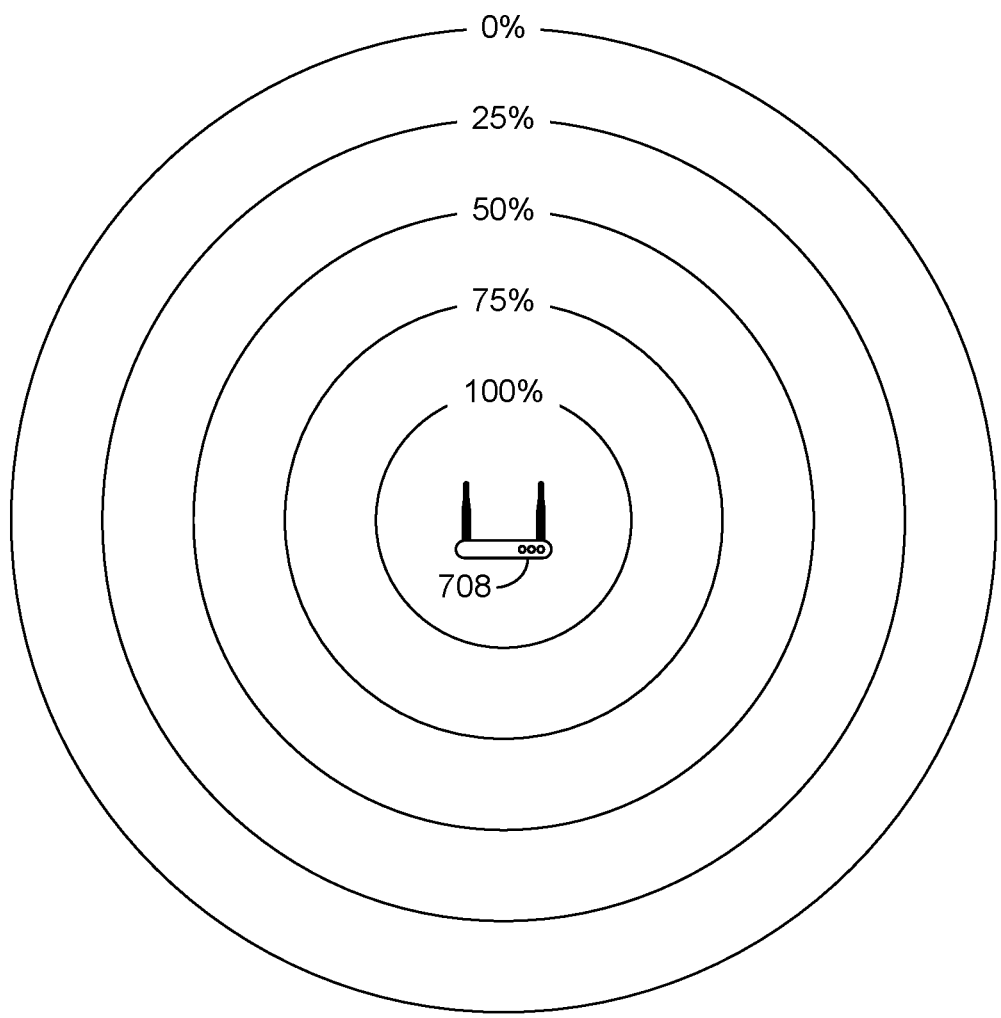
FIG. 7A, FIG. 7B, FIG. 7C, FIG. 7D, and FIG. 7E provide illustrations of the arrangement of wireless network devices in a network environment, in accordance with some embodiments.

As illustrated in FIG. 7A, smartphone 704 is positioned at a location outside of the wireless range of wireless access point 708. If it is desired to provide wireless connectivity to smartphone 704, a wireless range extender 712 may be used. For example, a wireless range extender 712 may make a first wireless association with wireless access point 708 and a second wireless association with smartphone 704 and function as a relay or bridge, providing network connectivity between smartphone 704 and wireless access point 708.

Figure 7B:
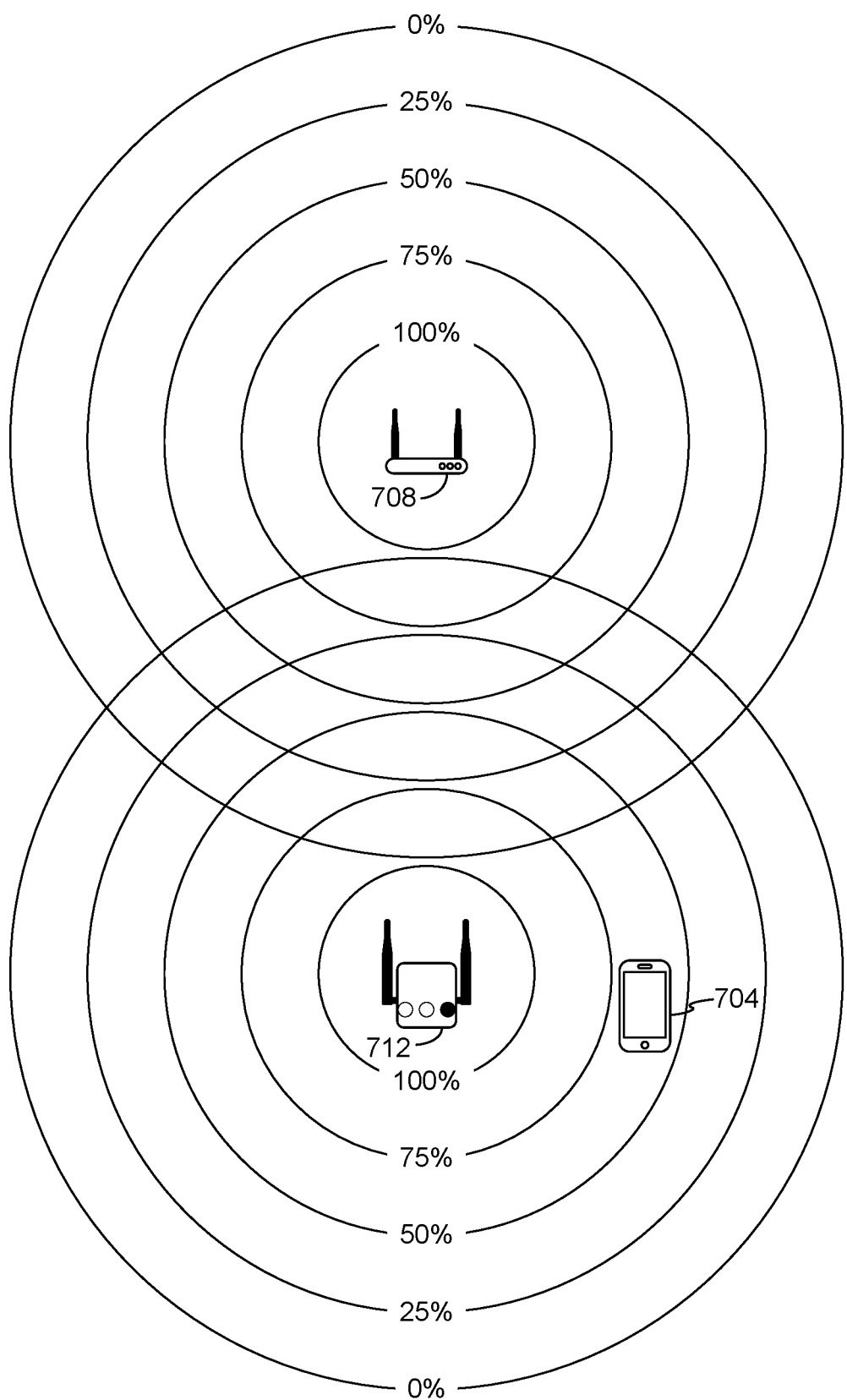

In FIG. 7B, wireless range extender 712 is positioned at a location where smartphone 704 receives a wireless signal of suitable strength for network communications with wireless range extender. However, wireless range extender 712 and wireless access point 708 are positioned at a relative location to one another such that wireless range extender 712 and wireless access point 708 can not establish wireless communications with one another. Accordingly, wireless range extender may determine that this location is not optimal and may generate a notification indicating a need to move the wireless range extender closer to the wireless access point. The notification may be included on a web page generated by wireless range extender 712, for example, which may be displayed by smartphone 704 or another network device. The notification may be displayed directly by wireless range extender 712, such as using one or more lights or audible signals. As depicted, wireless range extender 712 includes multiple lights, such as light emitting diodes (LEDs) that illuminate according to whether the wireless range extender 712 should be moved closer to or further from the wireless access point 708. As illustrated in FIG. 7B, the right most LED on wireless range extender 712 is illuminated, indicating that the wireless range extender 712 needs to be moved closer to the wireless access point 708. It will be appreciated that other notification schemes may be implemented and that the notification schemes described here are merely examples.

Figure 7C:
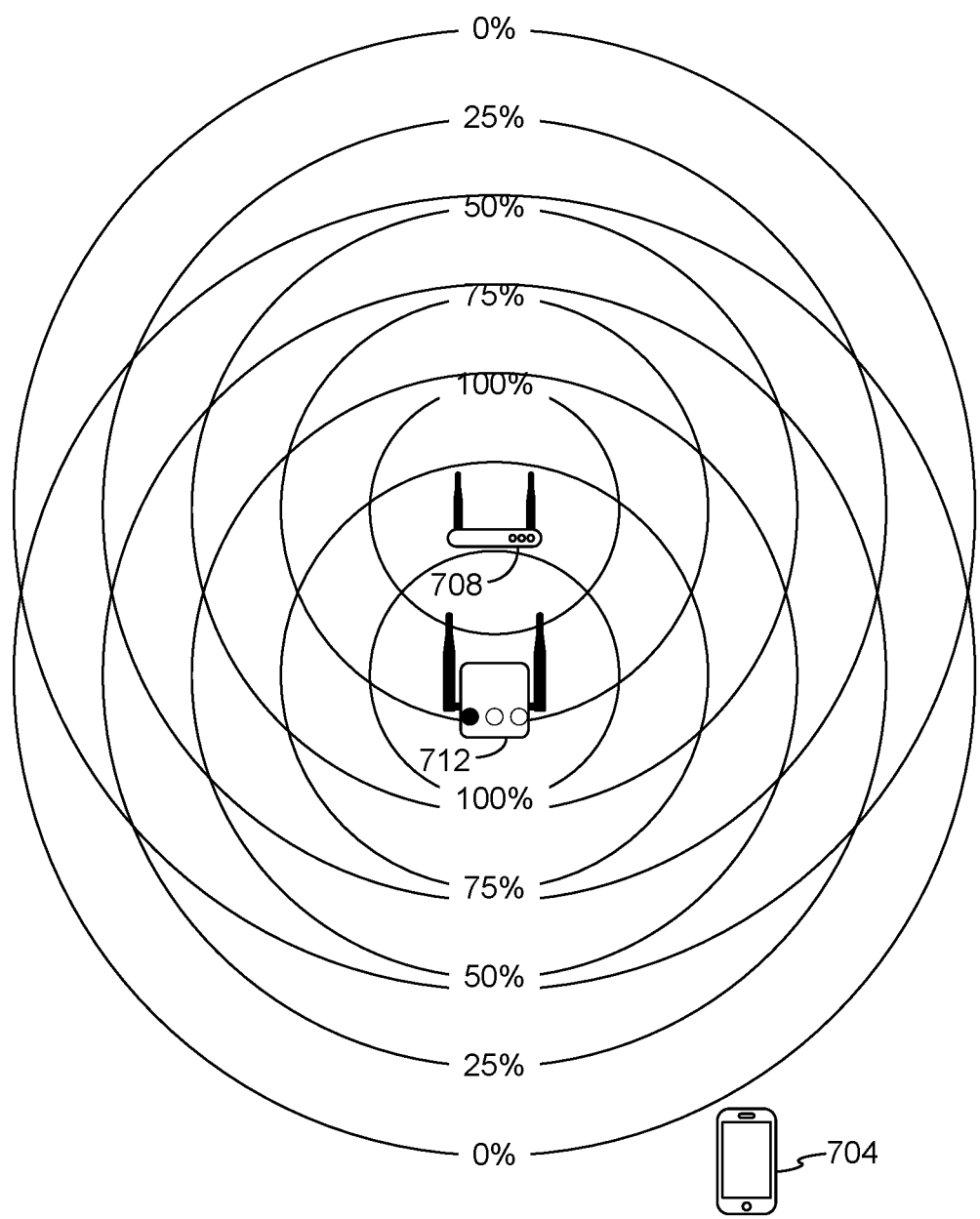

In FIG. 7C, wireless range extender 712 is positioned at a location where wireless access point 708 and wireless range extender 712 receive high signal strengths from one another and so can establish network communications with one another. However, smartphone 704 and wireless range extender 712 are positioned at a relative location to one another such that they can not establish wireless communications with one another. Wireless range extender 712 may determine that this location is not optimal, due to a detected high signal strength from wireless access point 708, and may generate a notification indicating that the wireless range extender 712 needs to be moved further away from the wireless access point 708. This determination may occur by analyzing the signal strength of wireless signals transmitted by wireless access point 708 and received by wireless range extender 712. For example, wireless range extender 712 may identify a signal strength greater than 75% as not optimal. As with FIG. 7B, the notification may be included on a web page generated by wireless range extender 712; alternatively or additionally, the notification may be displayed directly by wireless range extender 712, such as using one or more lights or audible signals. As depicted, in FIG. 7C, the left most LED on wireless range extender 712 is illuminated, indicating that the wireless range extender 712 needs to be moved further away from the wireless access point 708.

Figure 7D:
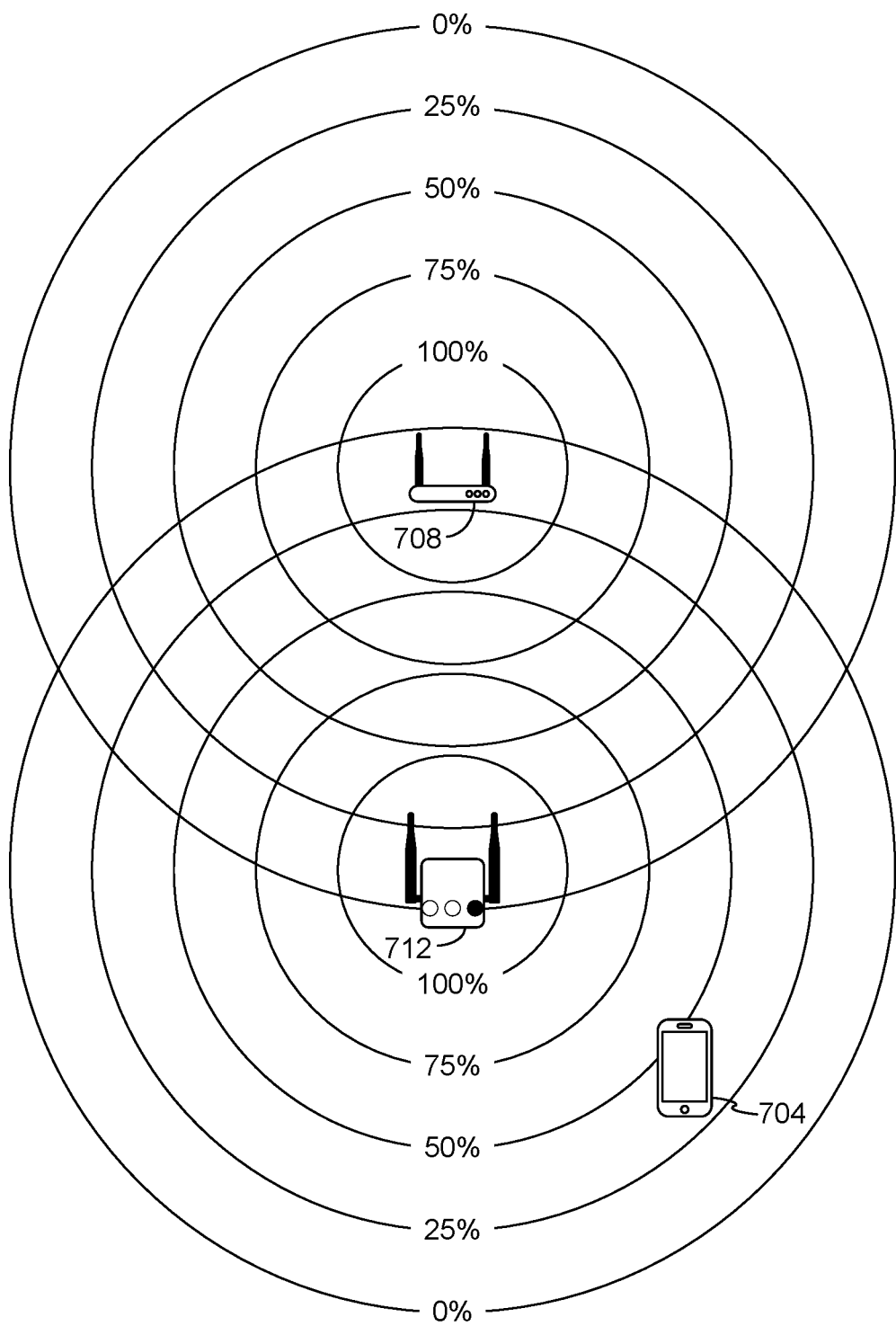

In FIG. 7D, wireless range extender 712 is positioned at a location where wireless access point 708 and wireless range extender 712 receive signal strengths from one another and so can establish network communications with one another. Smartphone 704 and wireless range extender 712 are positioned at a relative location to one another such that they can also establish wireless communications with one another. The signal strength received at wireless range extender 712 from wireless access point 708 may, however, be identified as too low, such as less than 25%, and so it may be determined by the wireless range extender 712 that the placement is also not optimal. Again, wireless range extender may generate a notification of non-optimal placement, such as a notification included on a web page generated by wireless range extender 712 and/or displayed directly by wireless range extender 712, such as using one or more lights or audible signals. As depicted, in FIG. 7D, the right most LED on wireless range extender 712 is illuminated, indicating that the wireless range extender 712 needs to be moved closer to the wireless access point 708.

Figure 7E:
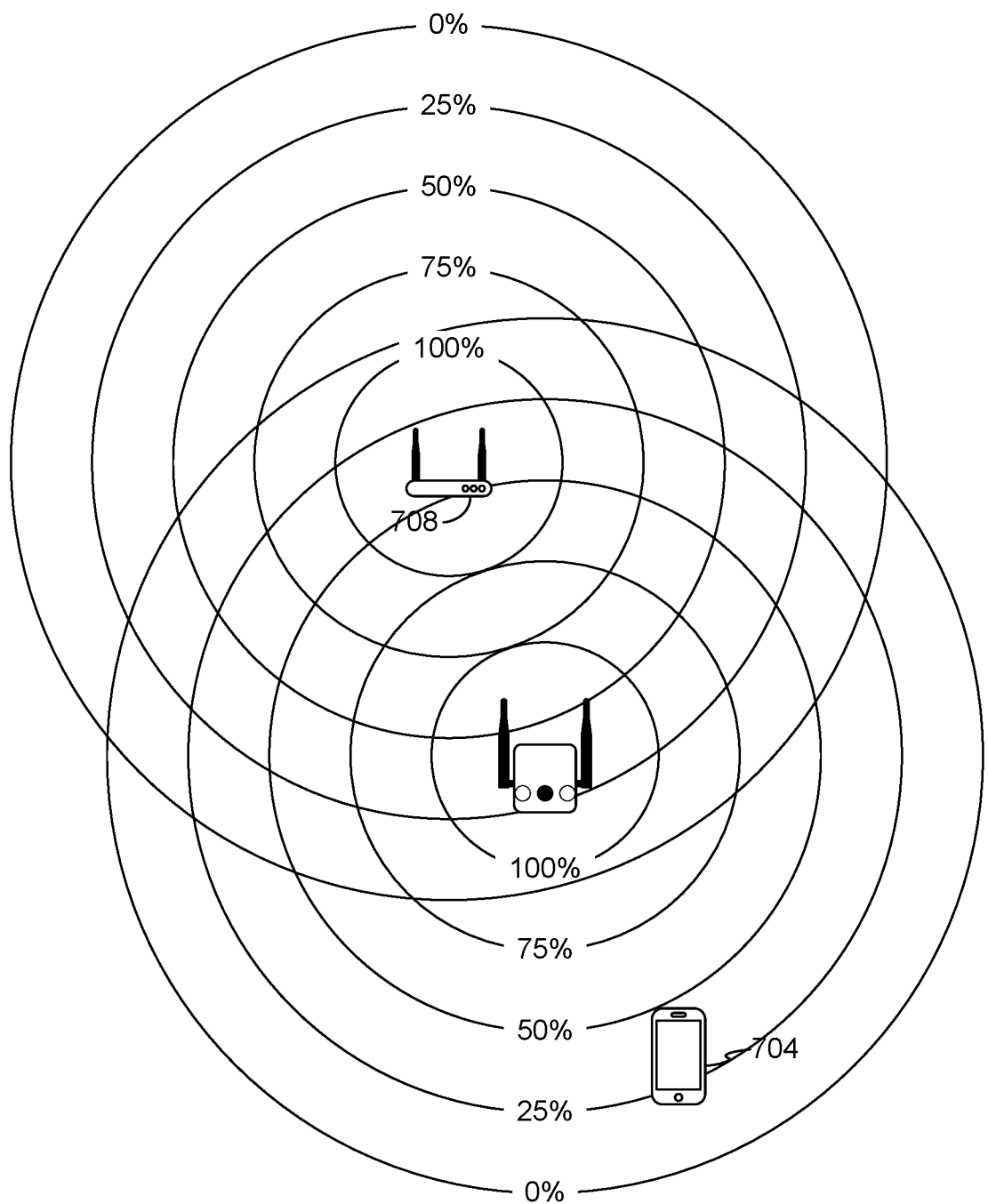

In FIG. 7E, wireless range extender 712 is positioned at a location where wireless access point 708 and wireless range extender 712 receive signals of suitable strengths from one another and so can establish network communications with one another. Smartphone 704 and wireless range extender 712 are positioned at a relative location to one another such that they can also establish wireless communications with one another. The signal strength received at wireless range extender 712 from wireless access point 708 may be identified as above a suitable low-threshold value (e.g., greater than 25%) and below a high-threshold value (e.g., less than 75%) and so it may be determined by the wireless range extender 712 that the placement is optimal. Again, wireless range extender may generate a notification of the optimal placement, such as a notification included on a web page generated by wireless range extender 712 and/or displayed directly by wireless range extender 712, such as using one or more lights or audible signals. As depicted, in FIG. 7E, the center LED on wireless range extender 712 is illuminated, indicating that the placement of wireless range extender 712 is optimal. It will be appreciated that, although a wireless range extender is depicted in FIGS. 7B-7E, other wireless network devices, such as a wireless bridge or other wireless repeater type device, may operate in a similar way as the wireless range extender.

FIGS. 8A-8D provide illustrations of example notifications for embodiments where the notification is included in a web page generated by a range extender. It will be appreciated that, although a wireless range extender is depicted in FIGS. 8A-8D as generating the notification, other wireless network devices, such as a wireless bridge or other wireless repeater type device, may operate in a similar way as the wireless range extender.

Figure 8A:
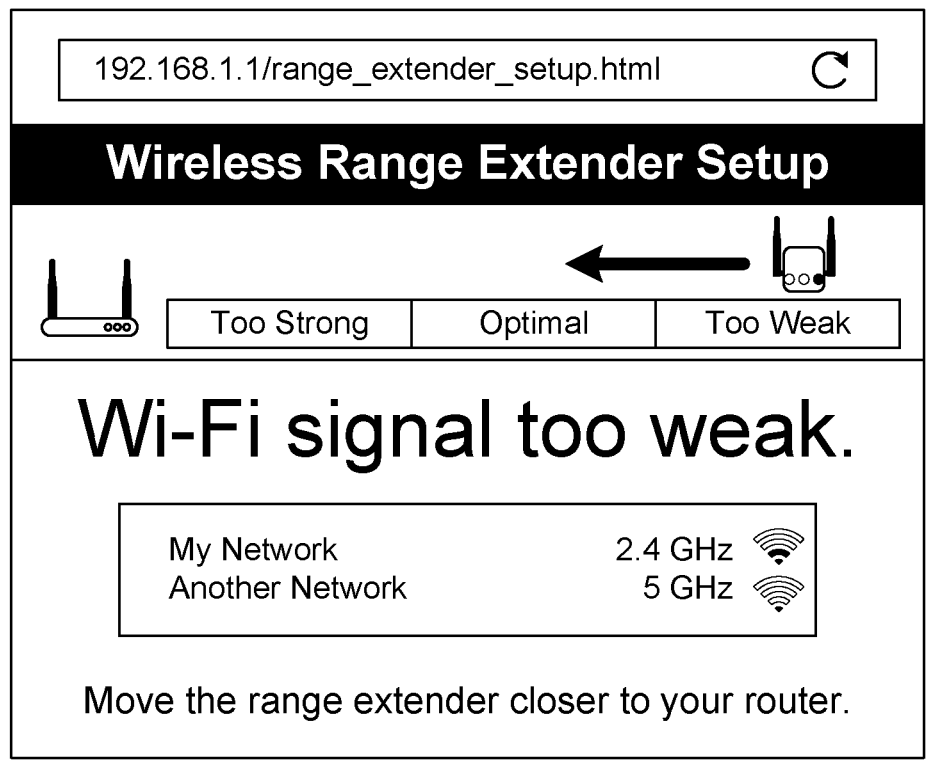
FIG. 8A, FIG. 8B, FIG. 8C, and FIG. 8D provide illustration of example notifications, in accordance with some embodiments.

The notification shown in FIG. 8A may correspond to, for example, the arrangement of devices illustrated in FIG. 7B, where the wireless range extender is positioned at a location where it is receiving a weak, low, or no signal strength wireless signal from the wireless router. The web page may be generated, for example, by the wireless range extender and displayed, for example, by the smartphone or other network device, which may access the web page using a browser application or other software application. As illustrated in FIG. 8A, the notification provides instructions to move the wireless range extender closer to the wireless router.

Figure 8B:
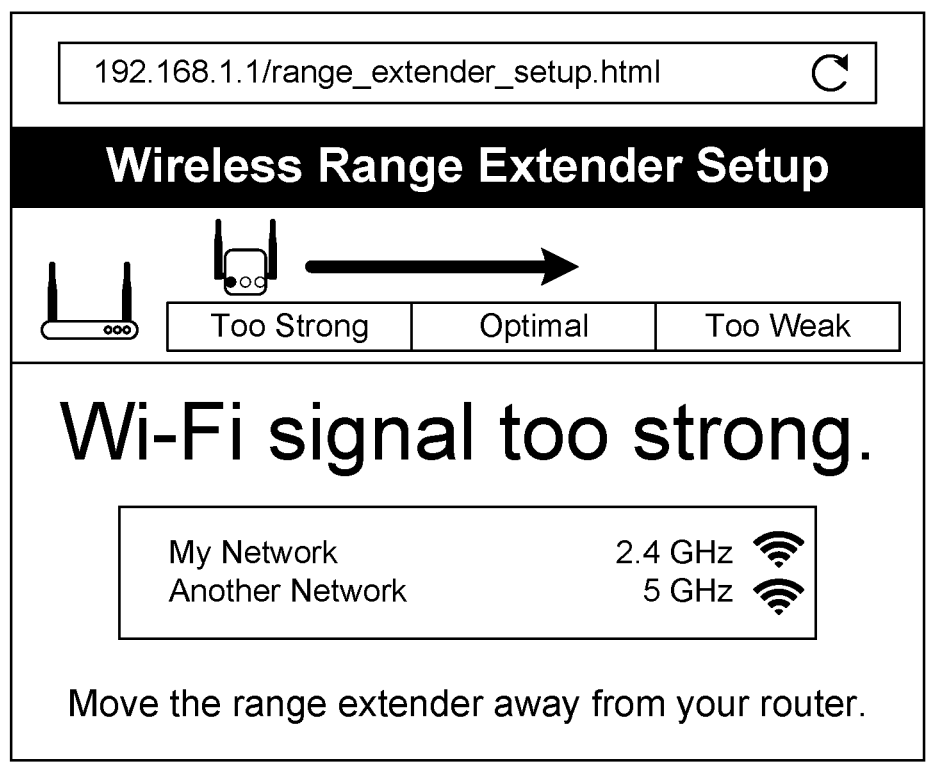

The notification shown in FIG. 8B may correspond to, for example, the arrangement of devices illustrated in FIG. 7C, where the wireless range extender is positioned at a location where it is receiving a strong or high signal strength wireless signal from the wireless router. The web page may be generated, for example, by the wireless range extender and displayed, for example, by a smartphone, laptop, or other network device, which may access the web page using a browser application or other software included on the device. As illustrated in FIG. 8B, the notification provides instructions to move the wireless range extender away from the wireless router.

It will further be appreciated that a wireless range extender or similar wireless network device may operate on AC power, such as may be provided through standard 120 V/60 Hz AC NEMA 5 wall outlets in the United States, or DC power, such as may be generated by an AC/DC converter, etc. In order to change the position of the wireless it may be necessary to remove power from the wireless range extender. In embodiments, the wireless range extender detects the loss of power and, upon power being restored, may resume the wireless network detection and position optimization process. In some embodiments, a notification is generated indicating that the process is being resumed, such as a web page that allows a user to provide input selecting whether to resume the optimization process or to start the setup process over. In order to facilitate the resumption, information, such as a selected wireless network and credential information, may be stored by the wireless range extender to a non-transitory storage device included in the wireless range extender prior to power being removed and loaded upon power being restored.

One advantage of generating a web page including the notification, as compared to an LED light or audible notification, for example, is that more granular information can be provided to the user, such as information relating to the exact signal strength observed, information about how far and in what direction to move the range extender, etc. Further, it will be appreciated that a display included in the wireless range extender (e.g., a liquid crystal display (LCD) or e-ink display) may operate to display the notification and not require an external network device for displaying a web page generated by the wireless range extender.

Figure 8C:
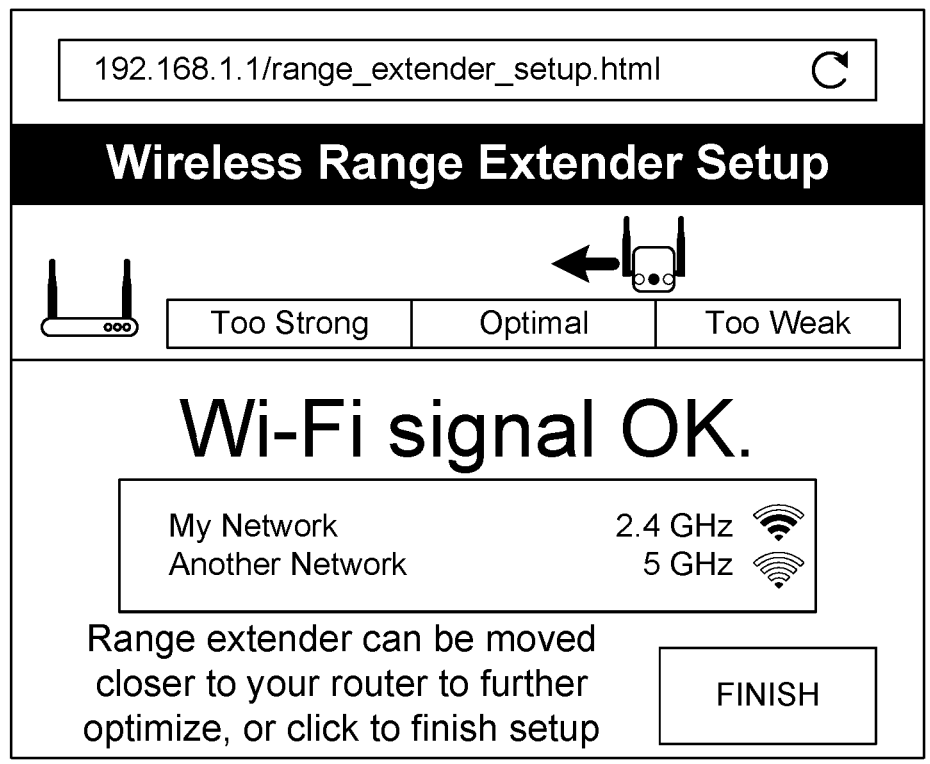

The notification shown in FIG. 8C may correspond to, for example, the arrangement of devices illustrated in FIG. 7D, where the wireless range extender is positioned at a location where it is receiving a moderate signal strength wireless signal from the wireless router, which may allow the device to operate, though may result in some interruptions. In addition, although the signal strength for one wireless band may be of sufficient strength, such as the 2.4 GHz band illustrated in FIG. 8C, another band may only receive a weak or poor strength signal, such as the 5 GHz band illustrated in FIG. 8C. Accordingly, the notification generated by the wireless range extender may include information that the signal may be sufficient, but could potentially be further optimized by moving the range extender closer to the wireless router. The notification may be implemented in a web page generated, for example, by the wireless range extender and displayed, for example, by the smartphone illustrated in FIG. 7D, which may access the web page using a browser application or other software included on the smartphone.

It will also be appreciated that additional information and/or instructions in the notification other than those illustrated herein may be provided by the wireless range extender. For example, a notification may indicate that the wireless signal strength is sufficient and falls within the optimal range but range may be further optimized by moving the wireless range extender further away from the wireless access point. Additionally, notifications may provide information about signal strength per band or for multiple wireless access points. Other information may be generated by the wireless range extender to include in the notification, depending on the configuration. For example, a wireless range extender may include location determination or approximation hardware, such as global positioning system (GPS) hardware, Bluetooth Low Energy hardware, which may be useful for proximity determination, etc. In such as configuration, a floor plan type display may be generated to indicate the relative position of wireless devices, similar to the illustrations in FIGS. 7A-7E, for example. Proximity determination hardware may optionally be paired with software included on a wireless network device, such as an application operating on a smartphone, in order to make use of and/or detect the proximity of a device to one or more Bluetooth beacon devices, for example.

Figure 8D:
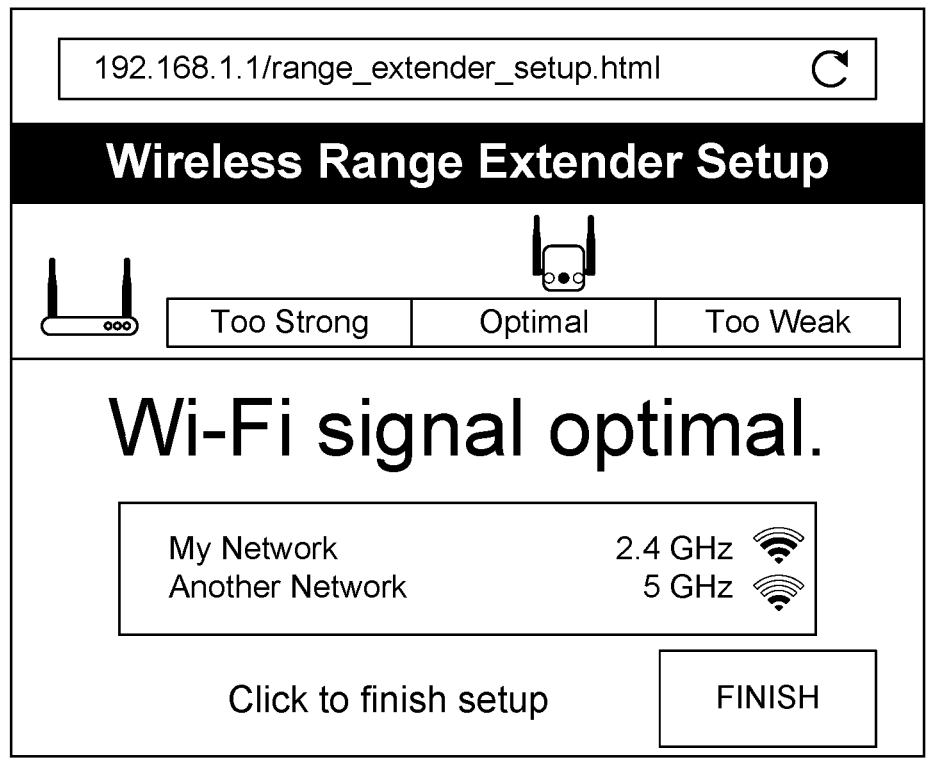

The notification shown in FIG. 8D may correspond to, for example, the arrangement of devices illustrated in FIG. 7E, where the wireless range extender is positioned at a location where it is receiving a good signal strength wireless signal from the wireless router, which may allow the devices to communicate efficiently and provide optimal wireless range extension to nearby wireless network devices. Thus, the illustrated notification generated by the wireless range extender may include information that the signal may be sufficient and that the position of the wireless range extender is optimal and/or that the range of the wireless network is optimally extended.

Figure 9:
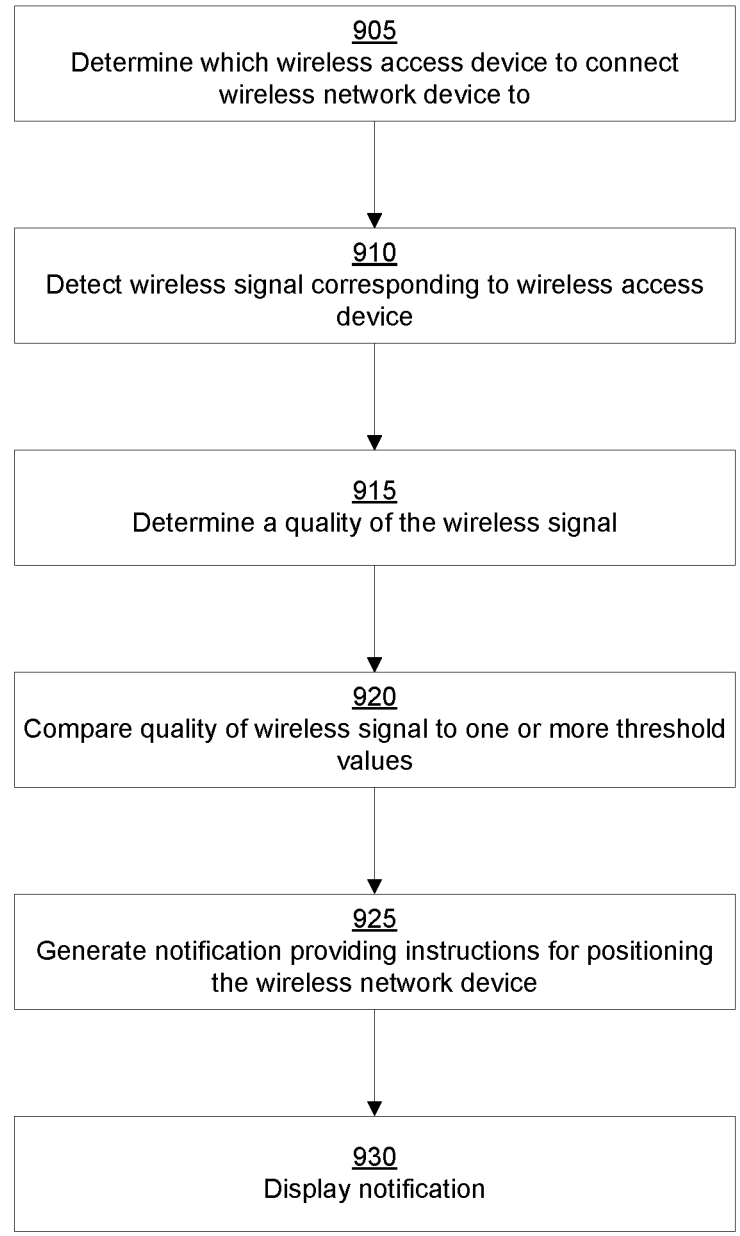
FIG. 9 provides a flowchart illustrating an embodiment of a process for determining an optimal position of a wireless network device.

FIG. 9 provides an overview of a method embodiment for determining optimal placement of a wireless network device, such as a wireless range extender or wireless bridge. At block 905, it is determined which wireless access device the wireless network device is to connect to, such as which wireless router, wireless access point, wireless range extender, etc. to connect to. The determination may be optionally made by receiving input from a user corresponding to selection of a wireless access device. As necessary, credential information may also be received corresponding to information needed to establish a wireless association with the wireless access device. In some embodiments, the determination may be made by reading stored determination information from a memory device, such as in the event of a power failure or power restoration at the wireless network device. At block 910, a wireless signal corresponding to the wireless access device is detected. It will be appreciated that the order of operations of block 905 and 910 may be reversed, such that the signal is first detected and the determination of the wireless access device follows thereafter. Optionally, the wireless signal may include information allowing the wireless network device to determine a quality of the wireless signal, such as a transmitted signal strength. At block 915, the quality of the wireless signal is determined. At block 920, the quality of the wireless signal is compared to one or more threshold values, such as to determine whether the quality of the wireless signal is too high, too low, or within a useful range, for example. This comparison may be later utilized, such as in block 925 where a notification is generated, such as a notification that includes instructions for positioning the wireless network device. At block 930, the notification is displayed. Optionally, the notification may include, for example, a webpage or other message that in some way provides the instructions. Optionally, the notification may be a visible alert, such as presented on a display of the wireless network device, such as an LCD display, e-ink display, LED display. Optionally, the notification is an audible alert. Optionally, the display of the notification is facilitated by use of another network device, such as by transmitting the notification to the other network device and displaying the notification on a display of the other network device, by using a web browser of the other network device, etc. Various display implementations are possible.

Figure 10:
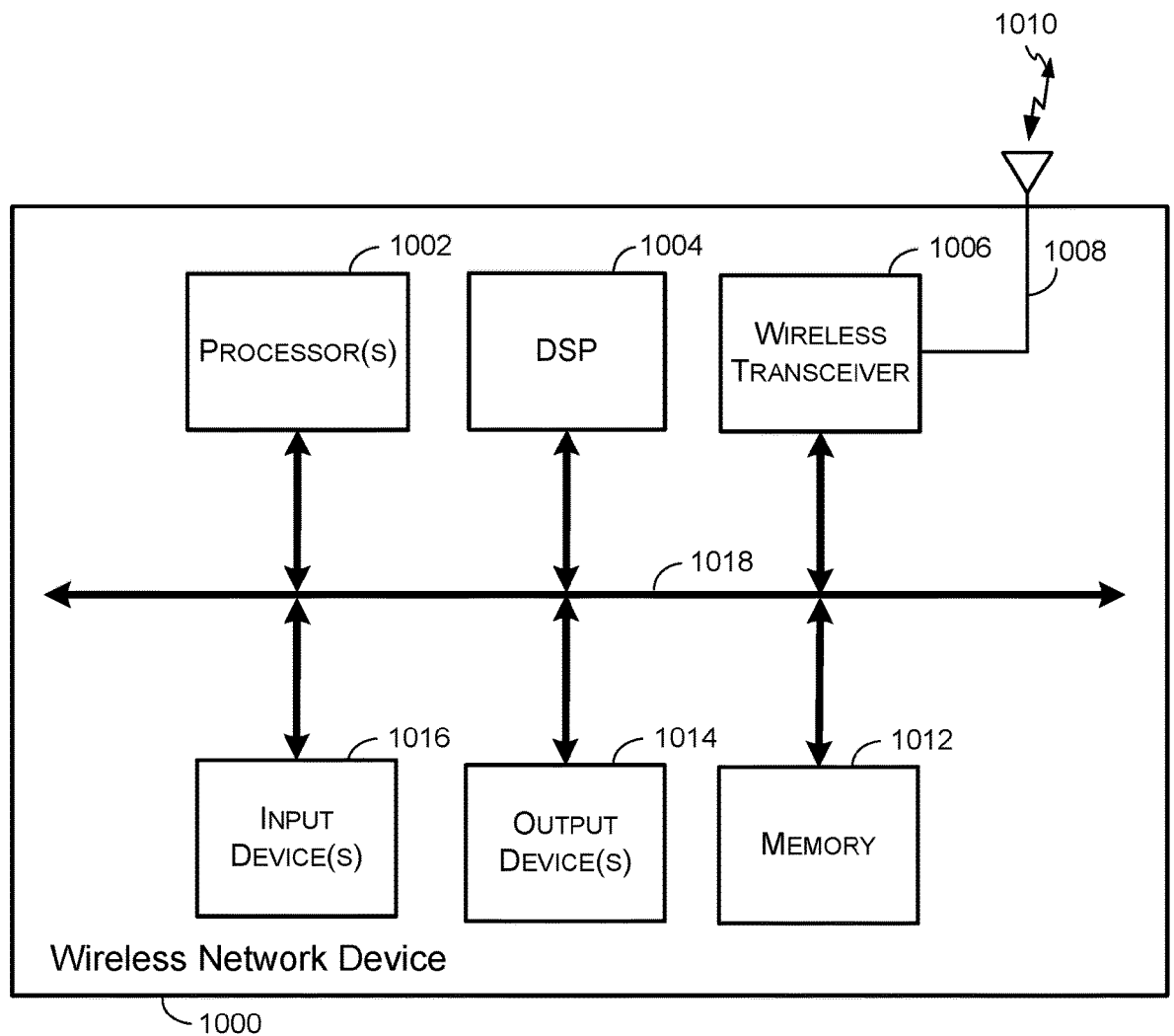
FIG. 10 illustrates an example of a wireless network device.

FIG. 10 illustrates an example of a wireless network device 1000. The wireless network device 1000 may include any human-to-machine interface with network connection capability that allows access to a network. For example, the wireless network device 1000 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an electronic device (e.g., television, security system, game console, browser, or the like), a speech or gesture interface (e.g., Kinect™ sensor, Wiimote™, or the like), etc. The wireless network device 1000 includes hardware elements that can be electrically coupled via a bus 1018 (or may otherwise be in communication, as appropriate). In one embodiment, the bus 1018 can be used for the processor(s) 1002 to communicate between cores and/or with the memory 1012. The hardware elements may include one or more processors 1002, including without limitation one or more special-purpose processors (such as digital signal processing chips, graphics acceleration processors, and/or the like); one or more input devices 1016, which can include without limitation a camera, a mouse, a keyboard, a touch sensitive screen, a touch pad, a keypad, and/or the like; and one or more output devices 1014, which can include, without limitation, a display, a printer, and/or the like.

The wireless network device 1000 may include one or more wireless transceivers 1006 connected to the bus 1018. The wireless transceiver 1006 may be operable to receive wireless signals (e.g., signal 1010) via antenna 1008. The wireless signal 1010 may be transmitted via a wireless network. In some embodiments, the wireless network may be any wireless network such as a wireless local area network (e.g., local area network 100), such as Wi-Fi network, a Personal Access Network (PAN) (e.g., Bluetooth® or Zigbee®), or a cellular network (e.g. a GSM, WCDMA, LTE, CDMA2000 network). Wireless transceiver 1006 may be configured to receive various radio frequency (RF) signals (e.g., signal 1010) via antenna 1008 from one or more gateways, network devices, other access devices, cloud networks, and/or the like. Wireless network device 1000 may also be configured to decode and/or decrypt, via the digital signal processor (DSP) 1004 and/or processor(s) 1002, various signals received from one or more gateways, network devices, other access devices, cloud networks, and/or the like.

The wireless network device 1000 may further include (and/or be in communication with) one or more non-transitory machine-readable storage mediums or storage devices (e.g., memory 1012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1012, such as RAM, ROM, FLASH, or disc drive, and executed by processor(s) 1002 or DSP 1004. The wireless network device 1000 can also comprise software elements (e.g., located within the memory 1012), including, for example, an operating system, device drivers, executable libraries, and/or other code, such as one or more application programs, which may comprise computer programs implementing various functions. Merely by way of example, one or more procedures described with respect to the processes discussed above may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 5, for example. Memory 1012 may be a non-transitory machine-readable storage medium, processor-readable memory, and/or a computer-readable memory that stores the one or more computer-program products configured to cause the processor(s) 1002 and/or DSP 1004 to perform the various functions. In other embodiments, the various functions described may be performed in hardware.

Figure 11:
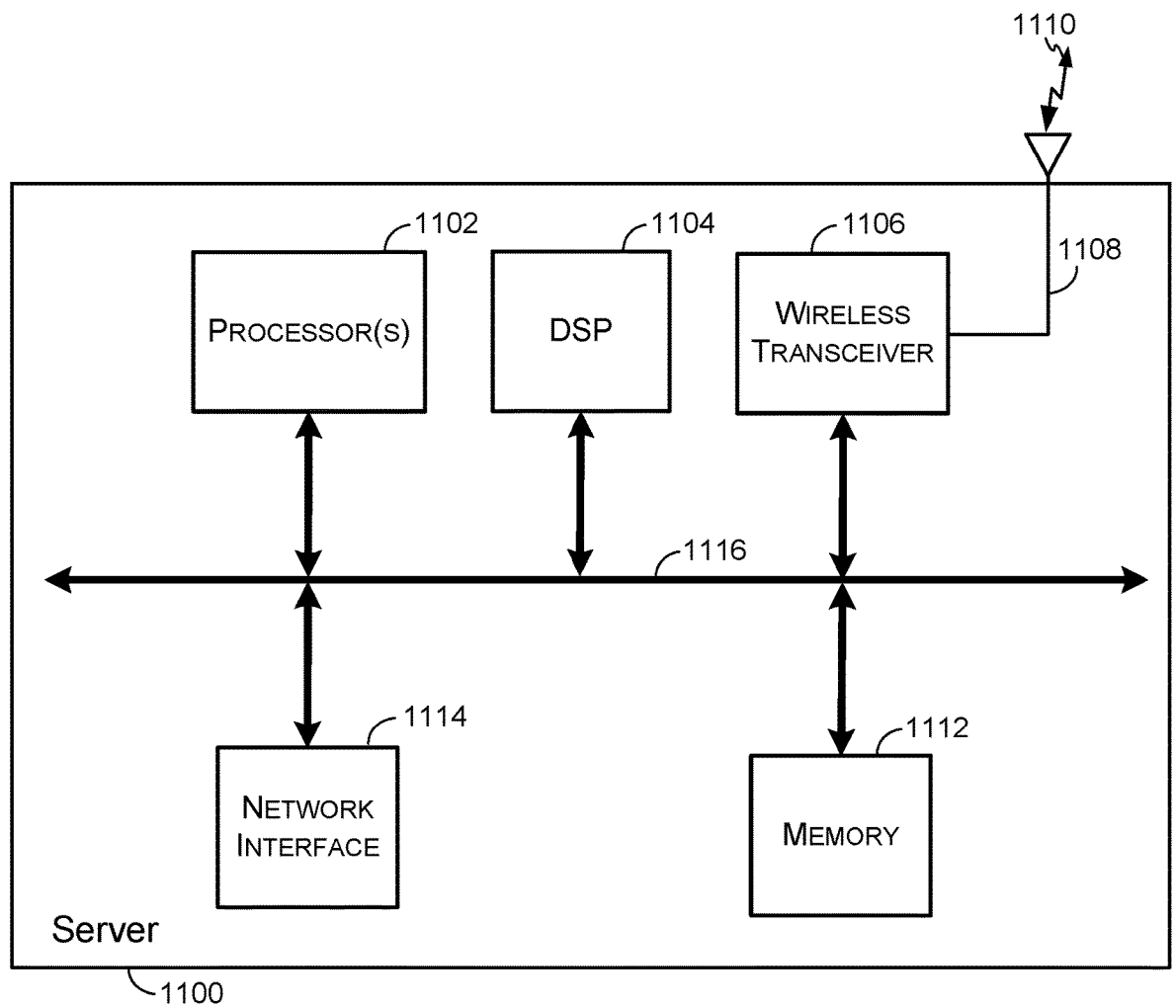
FIG. 11 illustrates an example of a server.

FIG. 11 illustrates an example of a server 1100. The server 1100 includes hardware elements that can be electrically coupled via a bus 1116 (or may otherwise be in communication, as appropriate). In one embodiment, the bus 1116 can be used for the processor(s) 1102 to communicate between cores and/or with the memory 1112. The hardware elements may include one or more processors 1102, including without limitation one or more special-purpose processors (such as digital signal processing chips, graphics acceleration processors, and/or the like), memory 1112, DSP 1104, a wireless transceiver 1106, a bus 1116, and antenna 1108. Furthermore, in addition to the wireless transceiver 1106, server 1100 can further include a network interface 1114 to communicate with a network (e.g., a local area network, a network of a preferred carrier, Internet, etc.).

The server 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1112. The server 1100 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. The memory 1112 may be a non-transitory machine-readable storage medium, processor-readable memory, and/or a computer-readable memory that stores the one or more computer-program products configured to cause the processor(s) 1102 to perform the functions described. In other embodiments, one or more of the functions described may be performed in hardware.

A set of these instructions and/or code might be stored on a non-transitory machine-readable storage medium, such as the memory 1012. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions of one or more computer-program products might take the form of executable code, which is executable by the wireless network device 1000 and/or might take the form of source and/or installable code, which, upon compilation and/or installation on the wireless network device 1000 (e.g., using any of a variety of generally available compilers, installation programs, compression/decompression utilities, etc.) then takes the form of executable code.

Figure 12:
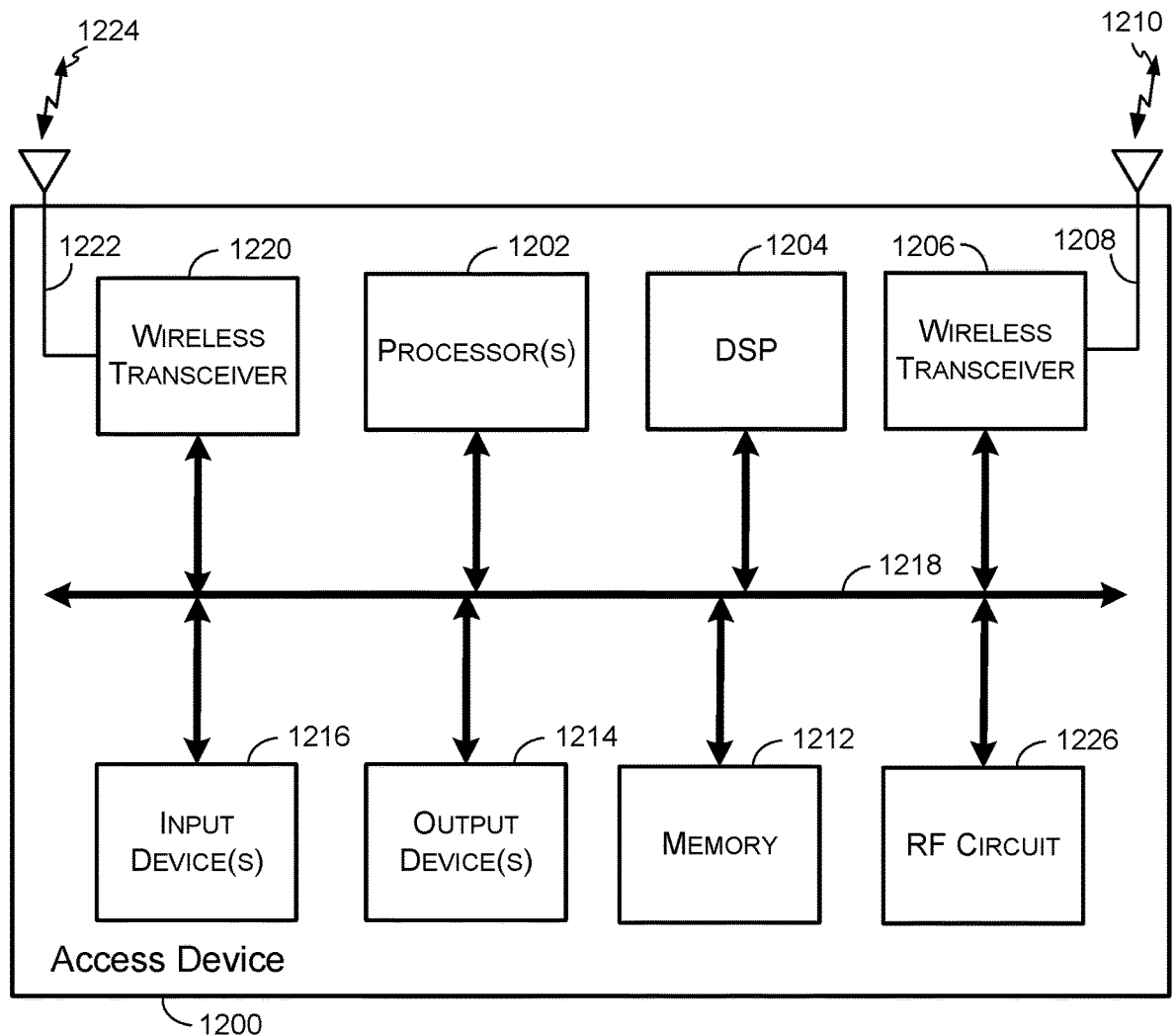
FIG. 12 illustrates an example of an access device.

FIG. 12 illustrates an example of an access device 1200. The access device 1200 may include a range extending device, a router, an access point, a modem, and/or any other device that provides network access among one or more computing devices and/or external networks. For example, the access device 1200 may include a router gateway with access point and router functionality, and may further include an Ethernet switch and/or a modem. As another example, the access device 1200 may include a range extending gateway that may be used to improve signal range and strength within a network by taking an existing signal from another gateway (e.g., a wireless access point, wireless router, or the like) and rebroadcasting the signal to create a second logical network.

The access device 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more special-purpose processors (such as digital signal processing chips, graphics acceleration processors, and/or the like); one or more input devices 1216, which can include without limitation one or more buttons, a keyboard, a keypad, a touch sensitive screen, a touch pad, and/or the like; and one or more output devices 1214, which can include, without limitation, a display, light or sound indicators, and/or the like.

The access device 1200 may include one or more wireless transceivers 1206 and 1220 connected to the bus 1218. The wireless transceiver 1206 may be operable to receive wireless signals (e.g., a wireless signal 1210) via an antenna 1208. The wireless transceivers 1220 may be operable to receive wireless signals (e.g., a wireless signal 1224) via an antenna 1222. The wireless transceivers 1206 and 1220 may each include a Wi-Fi transceiver radio designed to transmit and receive signals using frequencies of a specific frequency band, which may be referred to herein as "Wi-Fi circuits." For example, wireless transceiver 1206 may include a 2.4 GHz WiF-i circuit, and wireless transceiver 1220 may include a 5 GHz Wi-Fi circuit. Accordingly, the access device 1200 may include a single Wi-Fi circuit for a first Wi-Fi frequency band, and a single Wi-Fi circuit for a second Wi-Fi frequency band. In some embodiments, the access device 1200 may include multiple wireless transceivers (not shown) for each available frequency band. The antennas 1208 and 1222 may include multiple band antennas that can transmit and/or receive signals over different frequency bands.

The access device 1200 may further include radio frequency (RF) circuit 1226. In some embodiments, the wireless transceivers 1206 and 1220 may be integrated with or coupled to the RF circuit 1226 so that the RF circuit 1226 includes the wireless transceivers 1206 and 1220. In some embodiments, the wireless transceivers 1206 and 1220 and the RF circuit 1226 are separate components. The RF circuit 1226 may include a RF amplifier that may amplify signals received over antennas 1208 and 1222. The RF circuit 1226 may also include a power controller that may be used to adjust signal amplification by the RF amplifier. The power controller may be implemented using hardware, firmware, software, or any combination thereof.

The wireless signals 1210 and 1224 may be transmitted via a wireless network. In some embodiments, the wireless network may be any wireless network such as a wireless local area network (e.g., local area network 100), such as Wi-Fi™, a Personal Access Network (PAN), such as Bluetooth® or Zigbee®, or a cellular network (e.g. a GSM, WCDMA, LTE, CDMA2000 network). Wireless transceivers 1206 and 1220 may be configured to receive various radio frequency (RF) signals (e.g., signals 1210 and 1224) via antennas 1208 and 1224, respectively, from one or more other access devices, network devices, cloud networks, and/or the like. Access device 1200 may also be configured to decode and/or decrypt, via the DSP 1204 and/or processor(s) 1202, various signals received from one or more gateways, network devices, cloud networks, and/or the like.

The access device 1200 may include a power supply (not shown) that can power the various components of the access device 1200. The power supply may include a switch-mode power supply, a linear power supply, a push-pull power supply, or any other suitable type of power supply. In some embodiments, the access device 1200 may include multiple power supplies. For example, a switch-mode power supply may be used to condition input power, and a linear power supply may be used to power the RF circuit 1226. The power supply may be configured to operate over various ranges of appropriate input voltages.

The access device 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory, such as RAM, ROM, FLASH, or disc drive, and executed by one or more processors. A network device can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 5 and 9, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIGS. 5 and 9. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions of one or more computer-program products might take the form of executable code, which is executable by the gateway and/or might take the form of source and/or installable code, which, upon compilation and/or installation on the gateway (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

We claim:

1. A wireless range extender comprising:
   one or more processors;
   a wireless transceiver communicatively coupled to the one or more processors;
   a non-transitory computer readable storage medium communicatively coupled to the one or more processors, wherein the non-transitory computer readable storage medium includes instructions that, when executed by the one or more processors, cause the one or more processors to perform operations including:
   detecting a wireless signal using the wireless transceiver, wherein the wireless signal corresponds to a wireless access device, wherein the wireless range extender has established a wireless association with the wireless access device;
   determining a measure of a received power of the wireless signal by the wireless transceiver;
   determining that a quality of the wireless signal can be improved by moving the wireless range extender to a different position based on comparing the measure of the received power of the wireless signal to a predetermined range of power values;
   determining a current location of the wireless range extender;
   generating a floor plan display when the measure of the received power is within the range of power values, wherein the floor plan display includes an icon representing the wireless range extender, an icon representing the wireless access device, and an indication to move the wireless range extender to a different location by moving the wireless range extender with respect to the current location of the wireless range extender and the wireless access device; and
   facilitating displaying the floor plan display.

2. The wireless range extender of claim 1, wherein the operations further comprise:
   receiving input corresponding to determination of a network identifier for a wireless access device;
   receiving input corresponding to determination of a credential for associating with the wireless access device; and
   establishing a wireless association with the wireless access device using the network identifier and the credential.

3. The wireless range extender of claim 1, wherein establishing the wireless association includes:
   transmitting a probe request message; and
   receiving a probe response message, wherein the probe response message corresponds to the wireless access device.

4. The wireless range extender of claim 1, wherein detecting the wireless signal includes:
   receiving a wireless beacon message using the wireless transceiver, wherein the wireless beacon message corresponds to the wireless access device.

5. The wireless range extender of claim 1, wherein the operations further comprise:
   generating a keep-in-place notification when the measure of the received power is outside the range of power values, wherein the keep-in-place notification includes instructions to keep the wireless range extender at a current distance from the wireless access device; and
   facilitating displaying the keep-in-place notification.

6. The wireless range extender of claim 5, wherein the range power of values is −75 dBm to −50 dBm.

7. The wireless range extender of claim 1, wherein the floor plan display includes an indication of the measure of the received power.

8. The wireless range extender of claim 1, wherein the operations further include:
   detecting a new wireless signal using the wireless transceiver, wherein the new wireless signal corresponds to the wireless access device;
   determining a new measure of a new received power of the new wireless signal by the wireless transceiver;
   making a new determination that a quality of the wireless signal can be improved by moving the wireless range extender to a different position based on comparing the measure of the received power of the wireless signal to the predetermined range of power values;
   generating a new floor plan display based on the new determination, wherein the new floor plan display includes instructions for positioning the wireless range extender closer to the wireless access device or further away from the wireless access device; and
   facilitating displaying the new floor plan display.

9. The wireless range extender of claim 1, wherein the operations further include:
   monitoring a characteristic of the wireless association;
   determining a statistical measure of the characteristic of the wireless association;
   generating a notification using the statistical measure, wherein the notification includes instructions for positioning the wireless range extender closer to the wireless access device or further away from the wireless access device; and
   facilitating displaying the notification.

10. The wireless range extender of claim 1, wherein facilitating displaying the floor plan display includes displaying the floor plan display on a display of the wireless range extender, or generating a web page including the floor plan display by the wireless range extender.

11. A computing device comprising:
    one or more processors;
    a non-transitory computer readable storage medium communicatively coupled to the one or more processors, wherein the non-transitory computer readable storage medium includes instructions that, when executed by the one or more processors, cause the one or more processors to perform operations including:

detecting a wireless signal, wherein the wireless signal corresponds to a wireless access device, wherein a wireless range extender has established a wireless association with the wireless access device;

determining a measure of a received power of the wireless signal;

determining that a quality of the wireless signal can be improved by moving the wireless range extender to a different position based on comparing the measure of the received power of the wireless signal to a predetermined range of power values;

determining a current location of the wireless range extender;

generating a floor plan display when the measure of the received power is within the range of power values, wherein the floor plan display includes an icon representing the wireless range extender, an icon representing the wireless access device, and an indication to move the wireless range extender to a different location by moving the wireless range extender with respect to the current location of the wireless range extender and the wireless access device; and facilitating displaying the floor plan display.

12. The computing device of claim 11, wherein the operations further comprise:

receiving input corresponding to determination of a network identifier for a wireless access device;

receiving input corresponding to determination of a credential for associating with the wireless access device; and establishing a wireless association with the wireless access device using the network identifier and the credential.

13. The computing device of claim 11, wherein establishing the wireless association includes:

transmitting a probe request message; and receiving a probe response message, wherein the probe response message corresponds to the wireless access device.

14. The computing device of claim 11, wherein detecting the wireless signal includes:

receiving a wireless beacon message, wherein the wireless beacon message corresponds to the wireless access device.

15. The computing device of claim 11, wherein the operations further comprise:

generating a keep-in-place notification when the measure of the received power is outside the range of power values, wherein the keep-in-place notification includes instructions to keep the wireless range extender at a current distance from the wireless access device; and facilitating displaying the keep-in-place notification.

16. The computing device of claim 11, wherein the floor plan display includes an indication of the measure of the received power.

17. The computing device of claim 11, wherein the operations further include:

detecting a new wireless signal, wherein the new wireless signal corresponds to the wireless access device;

determining a new measure of a new received power of the new wireless signal;

making a new determination that a quality of the wireless signal can be improved by moving the wireless range extender to a different position based on comparing the measure of the received power of the wireless signal to the predetermined range of power values;

generating a new floor plan display based on the new determination, wherein the new floor plan display includes instructions for positioning the wireless range extender closer to the wireless access device or further away from the wireless access device; and facilitating displaying the new floor plan display.

18. The computing device of claim 11, wherein the operations further include:

monitoring a characteristic of the wireless association;

determining a statistical measure of the characteristic of the wireless association;

generating a notification using the statistical measure, wherein the notification includes instructions for positioning the wireless range extender closer to the wireless access device or further away from the wireless access device; and facilitating displaying the notification.

19. The computing device of claim 11, wherein facilitating displaying the floor plan display includes displaying the floor plan display on a display of the wireless range extender, or generating a web page including the floor plan display by the wireless range extender.

20. A computer-implemented method comprising:

detecting a wireless signal using a wireless transceiver, wherein the wireless signal corresponds to a wireless access device, wherein a wireless range extender has established a wireless association with the wireless access device;

determining a measure of a received power of the wireless signal by the wireless transceiver;

determining that a quality of the wireless signal can be improved by moving the wireless range extender to a different position based on comparing the measure of the received power of the wireless signal to a predetermined range of power values;

determining a current location of the wireless range extender;

generating a floor plan display when the measure of the received power is within the range of power values, wherein the floor plan display includes an icon representing the wireless range extender, an icon representing the wireless access device, and an indication to move the wireless range extender to a different location by moving the wireless range extender with respect to the current location of the wireless range extender and the wireless access device; and facilitating displaying the floor plan display.

\* \* \* \* \*